US008812636B2

(12) United States Patent
Song et al.

(10) Patent No.: US 8,812,636 B2
(45) Date of Patent: Aug. 19, 2014

(54) NETWORK MANAGEMENT APPARATUS AND METHOD BASED ON SIMPLE NETWORK MANAGEMENT PROTOCOL

(75) Inventors: Bong-Gyu Song, Suwon-si (KR); Seung-Pil Choi, Yongin-si (KR); Won-Chang Joe, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2096 days.

(21) Appl. No.: 11/281,682

(22) Filed: Nov. 18, 2005

(65) Prior Publication Data

US 2006/0106925 A1    May 18, 2006

(30) Foreign Application Priority Data

Nov. 18, 2004    (KR) ........................ 10-2004-0094795

(51) Int. Cl.
*G06F 15/173*    (2006.01)
*H04L 12/24*    (2006.01)

(52) U.S. Cl.
CPC .......... *H04L 41/0213* (2013.01); *H04L 41/046* (2013.01); *H04L 41/024* (2013.01)
USPC .......................................... 709/223; 709/201

(58) Field of Classification Search
CPC .. H04L 41/0213; H04L 41/024; H04L 41/046
USPC ................... 709/223, 201; 395/200.56
See application file for complete search history.

(56) References Cited

U.S. PATENT DOCUMENTS 5,913,037 A * 6/1999 Spofford et al. ............. 709/226
6,003,077 A * 12/1999 Bawden et al. .............. 709/223
6,009,431 A * 12/1999 Anger et al. .................. 707/10
6,332,142 B1 * 12/2001 LeBlanc ....................... 717/118
6,546,415 B1 * 4/2003 Park .............................. 709/202
6,587,440 B1 7/2003 Dawes (Continued)

FOREIGN PATENT DOCUMENTS

JP    2001-222486    8/2001
KR    10-2001-0090254 A    10/2001

(Continued)

OTHER PUBLICATIONS

Shu, Yun-Xing et al., "The Communication Mechanism of Master Agent and Subagents for SNMP", Journal of Luoyang Technology College, Jun. 2002, pp. 3-4, vol. 12, No. 2, China Academic Journal Electronic Publishing House, China.

*Primary Examiner* — Krista Zele
*Assistant Examiner* — James Forman
(74) *Attorney, Agent, or Firm* — Roylance, Abrams, Berdo and Goodman, LLP

(57) ABSTRACT

An apparatus and method is provided for managing a communication device using Simple Network Management Protocol (SNMP). When a developer creates an SNMP interface header file through an application program at a compile time, an extractor generates a management information base (MIB) file and object identifier information (OIDInfo) on the basis of the interface header file. When a manager makes an SNMP request at a run time, an agent sends the OIDInfo included in the SNMP request message to an OIDInfo processor. The OIDInfo processor refers to an OIDInfo memory and delivers general message service (GMS) information to the agent. A GMS request/response process between the agent and the application program is then performed on the basis of the GMS information.

11 Claims, 19 Drawing Sheets

(56) References Cited

U.S. PATENT DOCUMENTS

| | | | |
|---|---|---|---|
| 6,754,703 B1 * | 6/2004 | Spring | 709/223 |
| 7,289,971 B1 * | 10/2007 | O'Neil et al. | 705/44 |
| 7,533,167 B2 * | 5/2009 | Motoyama et al. | 709/224 |
| 2003/0009543 A1 * | 1/2003 | Gupta | 709/223 |
| 2003/0169462 A1 * | 9/2003 | Barrett et al. | 358/473 |
| 2004/0122922 A1 * | 6/2004 | Da Palma et al. | 709/223 |
| 2005/0034029 A1 * | 2/2005 | Ramberg et al. | 714/43 |
| 2005/0262229 A1 * | 11/2005 | Gattu et al. | 709/223 |
| 2007/0245012 A1 * | 10/2007 | Ewing et al. | 709/223 |

FOREIGN PATENT DOCUMENTS

| | | |
|---|---|---|
| KR | 10-2004-0001403 A | 1/2004 |
| RU | 2 217 875 C2 | 6/2003 |
| WO | WO 01/24444 A2 | 4/2001 |
| WO | WO 02/077830 A1 | 10/2002 |
| WO | WO 2005/069544 A1 | 7/2005 |

* cited by examiner

| Version | | | Date | | | ⎫ |
|---|---|---|---|---|---|---|
| DefaultOID | | | OIDTreeInfoOffset | | NotiInfoHdrOffset | ⎬ 1500 |
| objectId | nodeType | upOIDTreeInfoOffset | downOIDTreeInfoOffset | nextOIDTreeInfoOffset | gmsInfoOffset | ⎫ |
| objectId | nodeType | upOIDTreeInfoOffset | downOIDTreeInfoOffset | nextOIDTreeInfoOffset | gmsInfoOffset | ⎬ 1502 |
| ⋮ | | | | | | |
| OID | | | structName | | | ⎫ |
| structType | payloadType | requestMsgId | responseMsgId | portNumber | numberOfIndex | |
| numberOfField | payloadSize | pldRelationId | masterTableOffset | nextGMSInfoOffset | fristGMSAttInfoOffset | |
| OID | | | structName | | | ⎬ 1504 |
| structType | payloadType | requestMsgId | responseMsgId | portNumber | numberOfIndex | |
| numberOfField | payloadSize | pldRelationId | masterTableOffset | nextGMSInfoOffset | fristGMSAttInfoOffset | |
| ⋮ | | | | | | |
| objectId | attName | | asnType | accessType | fieldType | ⎫ |
| attType | attSize | startOffSet | subTableOffset | maxDimensionValue | nextAttInfoOffset | |
| objectId | attName | | asnType | accessType | fieldType | ⎬ 1506 |
| attType | attSize | startOffSet | subTableOffset | maxDimensionValue | nextAttInfoOffset | |
| ⋮ | | | | | | |
| numberOfNotiNodeInfo | | | fristNotiNodeInfoOffset | | | — 1508 |
| notiMsgId | | notiNodeInfoType | subNotiInfoHdrOffset | notiInfoOffset | | ⎫ |
| notiMsgId | | notiNodeInfoType | subNotiInfoHdrOffset | notiInfoOffset | | ⎬ 1510 |
| ⋮ | | | | | | |
| numberOfNotiNodeInfo | | | fristNotiNodeInfoOffset | | | — 1508 |
| notiMsgId | | notiNodeInfoType | subNotiInfoHdrOffset | notiInfoOffset | | ⎫ |
| notiMsgId | | notiNodeInfoType | subNotiInfoHdrOffset | notiInfoOffset | | ⎬ 1510 |
| ⋮ | | | | | | |
| notiOID | | notiInfoType | numberOfNotiField | fristNotiAttInfoOffset | | ⎫ |
| notiOID | | notiInfoType | numberOfNotiField | fristNotiAttInfoOffset | | ⎬ 1512 |
| ⋮ | | | | | | |
| notiAttOID | | | notiAttName | | | ⎫ |
| notiAttSize | notiAttType | notiASNType | notiFieldType | subNotiAttInfoOffset | nextNotiAttInfoOffset | |
| notiAttOID | | | notiAttName | | | ⎬ 1514 |
| notiAttSize | notiAttType | notiASNType | notiFieldType | subNotiAttInfoOffset | nextNotiAttInfoOffset | |
| ⋮ | | | | | | |

FIG.15B

NETWORK MANAGEMENT APPARATUS AND METHOD BASED ON SIMPLE NETWORK MANAGEMENT PROTOCOL

CROSS-REFERENCE TO RELATED APPLICATION

This application claims the benefit under 35 U.S.C. §119 (a) of Korean Patent Application No 10-2004-0094795 entitled "Network Management Apparatus and Method Based on Simple Network Management Protocol" filed in the Korean Intellectual Property Office on Nov. 18, 2004, the entire disclosure of which is incorporated herein by reference.

BACKGROUND OF THE INVENTION

1. Field of the Invention

The present invention relates generally to an apparatus and method for managing a network device. More particularly, the present invention relates to a network management apparatus and method for managing a communication device using Simple Network Management Protocol (SNMP).

2. Description of the Related Art

Integrated network management is difficult because of the rapid growth of networks in several past years and the advent of various heterogeneous systems. As networks scale up, network device management is becoming essential in many fields.

Therefore, network managers need a network framework for comprehensive management in various network environments. Due to this need, the main standards organization for the Internet, i.e., Internet Engineering Task Force (IETF), has adopted Simple Network Management Protocol (SNMP) corresponding to a relatively simple protocol as a standard for managing a network device based on the Internet.

In a conventional SNMP system, a management system is referred to as a manager and a management target is referred to as an agent. A management information transmission network for connecting the manager to the agent is based on Transmission Control Protocol/Internet Protocol (TCP/IP), and communication using SNMP uses a command for retrieving management information, a command for successively retrieving management information, a command for changing and writing management information, and a command for reporting an exceptional operation on the basis of a management information base (MIB) between the manager and the agent.

The SNMP agent is a software module placed in a management target device and has information about the MIB. This information is delivered to the SNMP manager using SNMP.

Specific information, resources, and so forth, that are to be managed using SNMP are referred to as objects. A collection of the objects is referred to as the MIB. The format of the MIB is defined as part of the SNMP, and the objects are defined using Abstract Syntax Notation One (ASN. 1).

The SNMP agent manages an MIB configured by parameters relating to a network device function. The SNMP manager obtains a specific value from MIBs provided by SNMP agents, and identifies a device state or changes the value.

As described above, an operation for conventionally managing a network using SNMP denotes an operation for obtaining a specific value from MIBs provided by management target devices, identifying a device state, and changing the value.

According to SNMP, a management method can be easily used, and various types of devices using TCP/IP can be developed. Through various Requests For Comments (RFCs), a management range can be easily designated or extended and protocols can be configured simply. Among the many management protocols, SNMP is widely used because it can be easily implemented.

FIG. 1 illustrates a conventional structure and control operation between an SNMP manager 100 and an SNMP agent 102.

First, commands transmitted/received between the SNMP manager 100 and the SNMP agent 102 as illustrated in FIG. 1 will be described.

GetRequest: denotes a request signal for reading an object value;

GetNextRequest: denotes a request signal for reading the next object value subsequent to the current object value;

GetResponse: denotes a response signal to a request;

SetRequest: denotes a signal for writing an object value; and

Trap: denotes a signal for reporting an exceptional situation.

The SNMP manager 100 and the SNMP agent 102 of FIG. 1 can communicate with each other using the above-described messages.

A conventional development method and a conventional method for interfacing with an application program will now be described with reference to FIGS. 2 and 3.

FIG. 2 is a flowchart illustrating a conventional method for developing the SNMP agent 102.

In step 200 of FIG. 2, a network manager defines an MIB to develop the SNMP agent 102, and defines a structure used for an interface with an associated application program.

In step 202, an MIB file is generated on the basis of the MIB defined in step 200. In step 204, the network manager codes and compiles the generated MIB file, thereby generating the SNMP agent 102.

In step 206, the network manager determines if the MIB or interface has been corrected. If the MIB or interface has been corrected, the network manager proceeds to step 208 to define management items.

In step 210, the network manager generates an MIB file on the basis of the management items defined in step 208. In step 212, the network manager recodes and recompiles the SNMP agent 102 on the basis of the generated MIB file.

FIG. 3 illustrates a conventional interface method between the manager 100 and application programs 304.

In order for the manager 100 to interface with the application programs 304, the agent 102 must know structure and destination information. When a conventional tool for developing the SNMP agent 102 is used, objects 302 corresponding to the management items must be implemented using a structure used in the application programs 304.

In the conventional method for developing the SNMP agent 102, an MIB is designed such that characteristics of a device can be reflected. Content of the designed MIB determines a development range of the SNMP agent 102, a role of the application programs 304 for performing a management function within the device, an interface method between the SNMP agent 102 and the application programs 304, and so on.

A conventional tool is used to effectively develop the SNMP protocol. The development of the SNMP agent 102 using the tool is facilitated when the SNMP agent 102 has necessary data. However, the development of the SNMP agent 102 is difficult and complex because MIB objects have different structures when an MIB object value is obtained through an interface with the application programs 304.

The SNMP manager 100 accesses management items managed in the different application programs 304 within a device through the SNMP agent 102. These management items are expressed by the MIB and differ according to device characteristics. This MIB cannot be perfectly defined at the time of initial development.

Because the SNMP agent 102 is conventionally developed on the basis of the above-described MIB, different SNMP agents 102 must be developed for devices. Items to be managed in an identical device can be frequently changed, added, or deleted. When a change is made, the SNMP agent 102 needs to be corrected.

Since the SNMP agent 102 must be corrected and recompiled whenever the MIB is changed, added, or deleted in the above-described environment, a great deal of time and effort is required for the development.

Accordingly, a need exists for an effective and efficient system and method for managing a communication device using Simple Network Management Protocol (SNMP).

SUMMARY OF THE INVENTION

Embodiments of the present invention are provided to substantially solve the above and other problems, and provide a network management apparatus and method based on Simple Network Management Protocol (SNMP) that generate a management information base (MIB) file and an object identifier information file in real time in a network management system.

Embodiments of the present invention provide a Simple Network Management Protocol (SNMP) management apparatus and method for controlling the operation of devices suitable for changes occurring in a network comprising a network management system.

Embodiments of the present invention provide a Simple Network Management Protocol (SNMP) management apparatus and method for operating devices comprising a network management system according to a standard.

In accordance with an object of the present invention, an apparatus is provided for generating a management information base (MIB) file for managing a communication device using Simple Network Management Protocol (SNMP) at a compile time and an object identifier information (OIDInfo) file for communication between an SNMP agent and an application program. The apparatus comprises a header file memory for storing a header file created by the application program to manage an SNMP device, an extractor for reading the header file from the header file memory and creating an MIB file and an OIDInfo file for exchanging a message between the SNMP agent and the application program, an MIB file memory for storing the MIB file created by the extractor, and an OIDInfo memory for storing the OIDInfo file created by the extractor.

In accordance with another object of the present invention, a method is provided for generating a management information base (MIB) file for managing a communication device using Simple Network Management Protocol (SNMP) at a compile time and an object identifier information (OIDInfo) file for communication between an SNMP agent and an application program. The method comprises the steps of creating an SNMP interface header file in an application program receiving a changed management item, reading the SNMP interface header file and generating an MIB file and an OID-Info file, and storing the MIB file and the OIDInfo file.

In accordance with another object of the present invention, a method is provided for performing a run time operation for receiving a Simple Network Management Protocol (SNMP) request message including a management item from a manager for managing a communication device using SNMP and making a response of a result of processing the management item. The method comprises the steps of receiving the SNMP request message for requesting data of the result of processing the management item from the manager in an agent, sending object identifier information (OIDInfo) included in the SNMP request message from the agent to an OIDInfo processor, sending information for communication between the agent and an application program storing the management item data requested by the manager from the OIDInfo processor to the agent on a basis of the OIDInfo, communicating with the application program in the agent on a basis of the communication information received from the OIDInfo processor and receiving the result of processing the management item requested by the manager from the application program, and sending the received result of processing the management item from the agent to the manager.

In accordance with another object of the present invention, an apparatus is provided for managing a communication device using Simple Network Management Protocol (SNMP) to perform a run time operation for receiving an SNMP request message including a management item from a manager for managing the communication device using SNMP and making a response of a result of processing the management item. The apparatus comprises an application program for performing an operation for requesting the management item, an object identifier information (OIDInfo) processing means for providing information for communicating with the application program when receiving predetermined OIDInfo mapped to the management item, and an agent for sending to the OIDInfo processing means, the OIDInfo mapped to the management item when receiving the SNMP request message from the manager, obtaining the information for communication with the application program, receiving a result of processing the management item from the application program, and sending the processing result to the manager.

BRIEF DESCRIPTION OF THE DRAWINGS

The above and other features and advantages of the present invention will become more clearly understood from the following detailed description taken in conjunction with the accompanying drawings, in which:

FIG. 15B is a table illustrating exemplary information comprising the items illustrated in FIG. 15A;

Throughout the drawings, like reference numerals will be understood to refer to like parts, components and structures.

DETAILED DESCRIPTION OF THE EXEMPLARY EMBODIMENTS

Exemplary embodiments of the present invention will now be described in detail herein below with reference to the accompanying drawings. In the following description, detailed descriptions of functions and configurations incorporated herein that are well known to those skilled in the art are omitted for clarity and conciseness.

Figure 1:
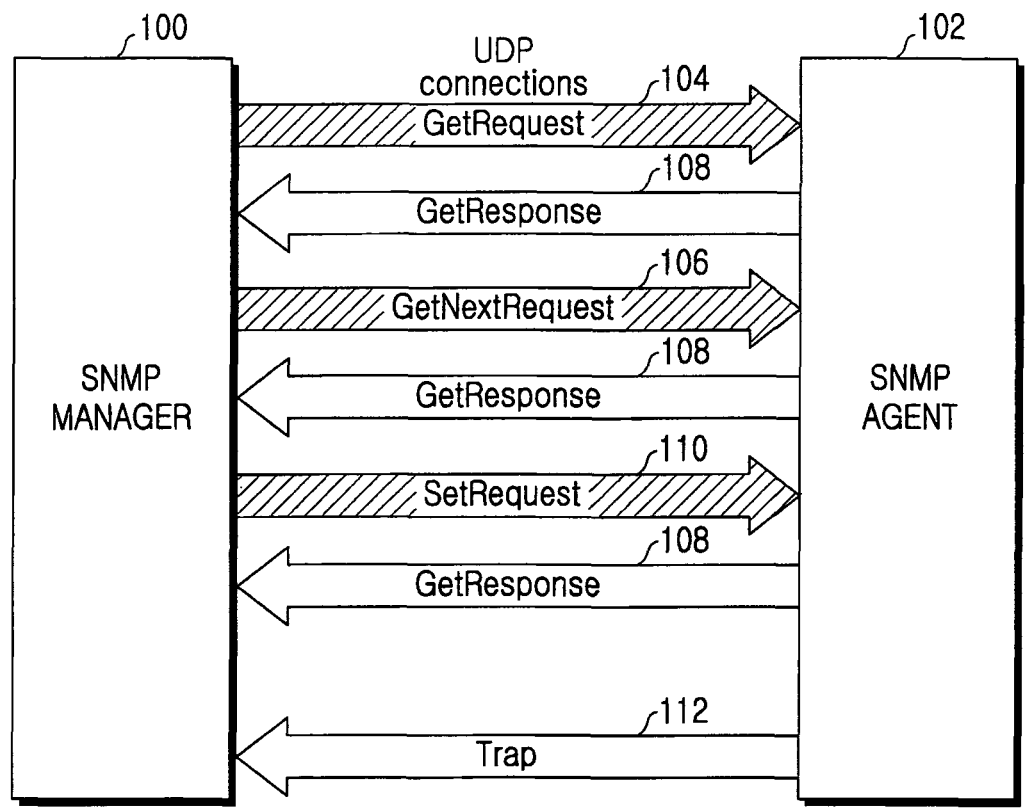
FIG. 1 illustrates a conventional structure and control operation between a Simple Network Management Protocol (SNMP) manager and an SNMP agent.
Figure 2:
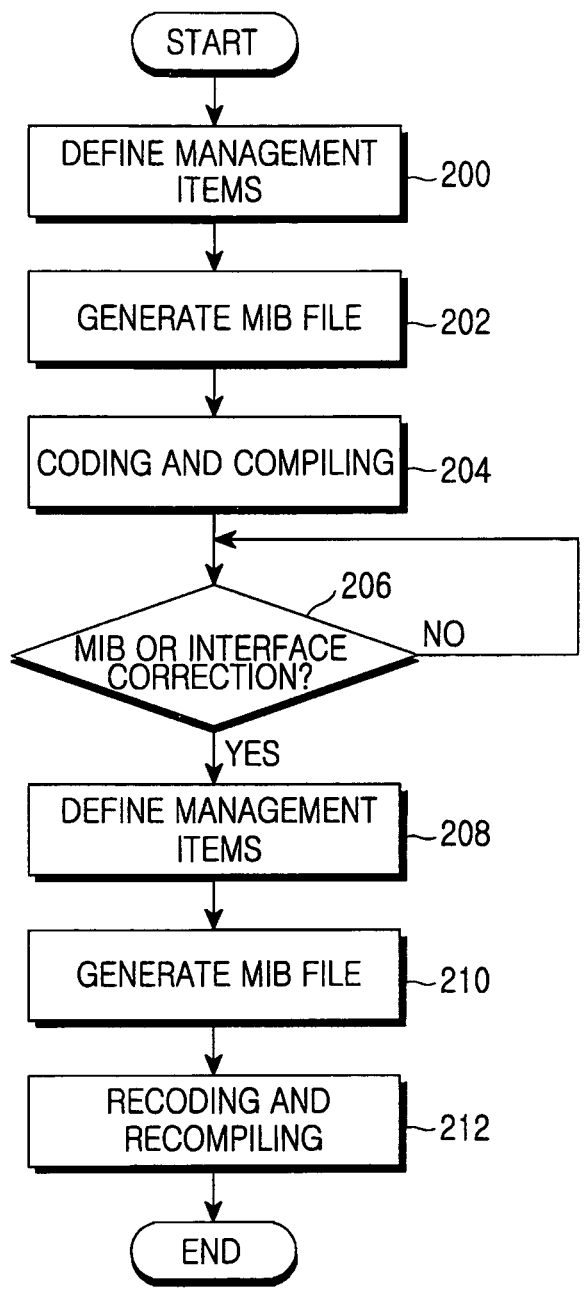
FIG. 2 is a flowchart illustrating a conventional method for developing the SNMP agent of FIG. 1.
Figure 3:
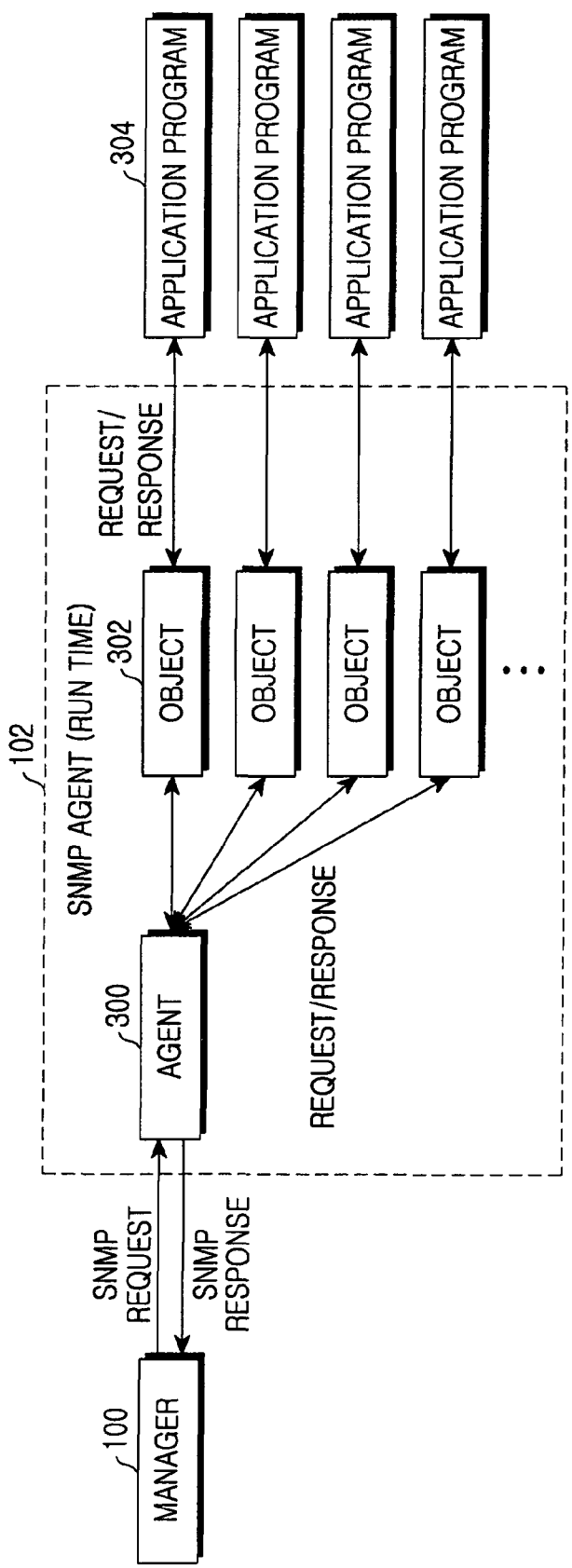
FIG. 3 illustrates a conventional interface method between manager and application programs.
Figure 4:
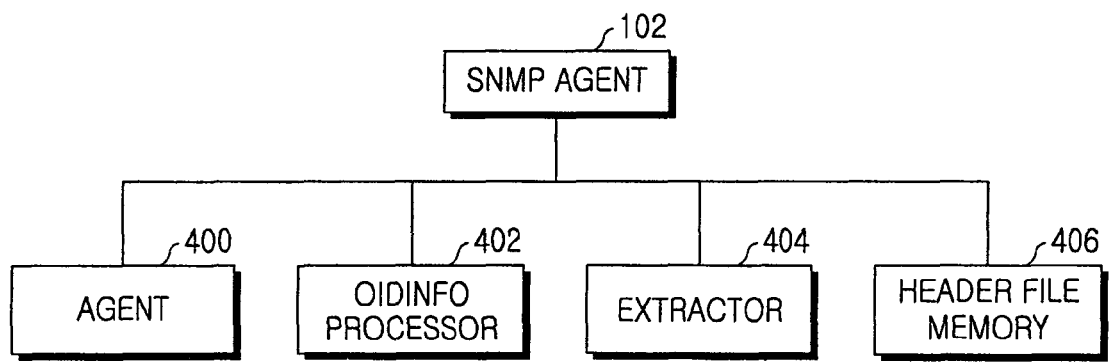
FIG. 4 is a block diagram illustrating an exemplary SNMP agent in accordance with an embodiment of the present invention.

In embodiments of the present invention, a Simple Network Management Protocol (SNMP) agent comprises four parts as illustrated in FIG. 4.

FIG. 4 is a block diagram illustrating an exemplary SNMP agent 102 in accordance with an embodiment of the present invention. The SNMP agent 102 performs a function for supporting SNMP in a network element.

The SNMP agent 102 comprises an agent 400 for processing an SNMP message and performing an interface with application programs, and an object identifier information (OIDInfo) processor 402 for processing OIDInfo corresponding to a library with information for creating a general message service (GMS) necessary for communication between the application programs and the agent 400.

Figure 5:
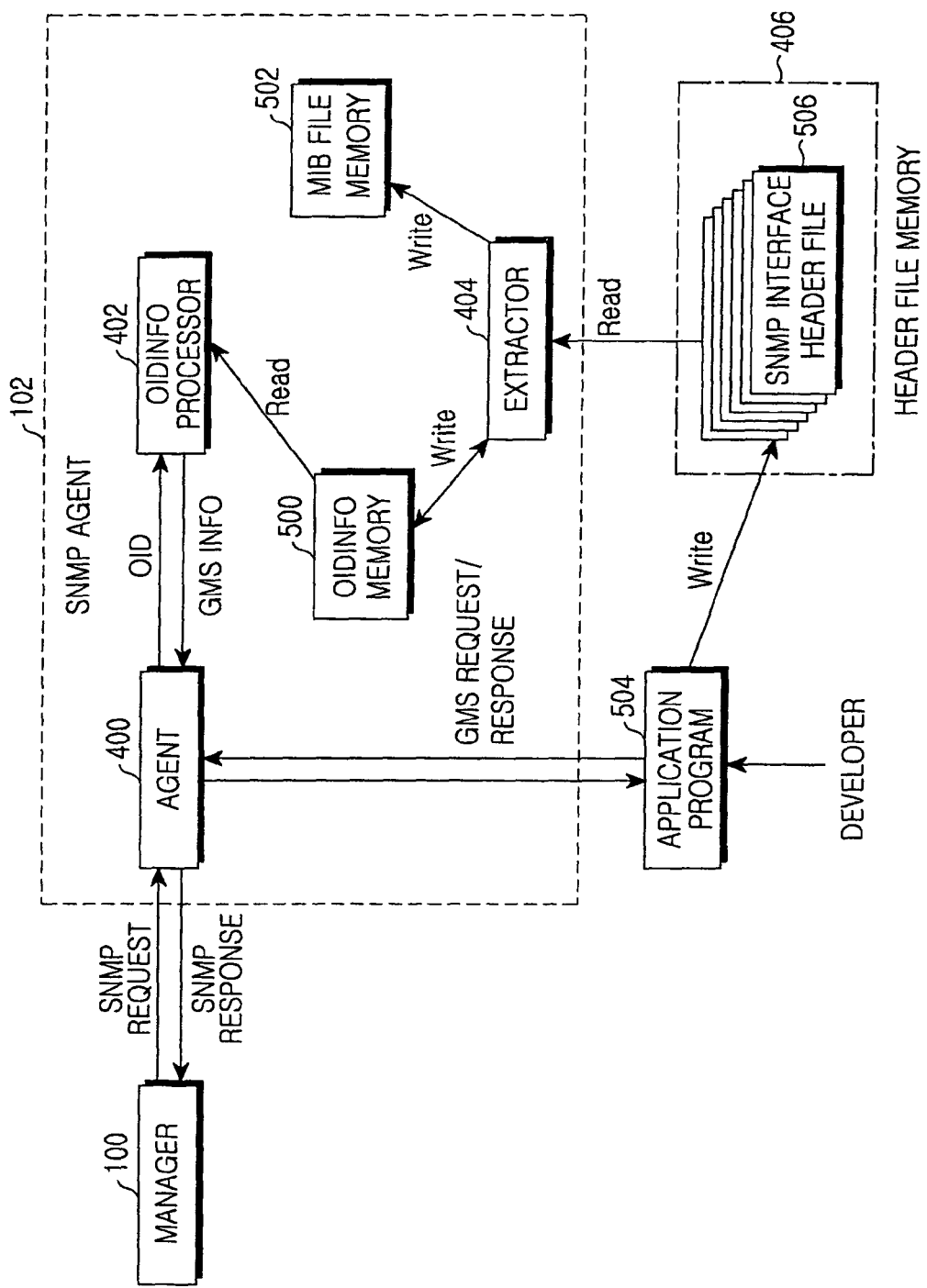
FIG. 5 is a block diagram illustrating the SNMP agent illustrated in FIG. 4 and an exemplary operation flow including a compile time and a run time in accordance with an embodiment of the present invention.

The SNMP agent 102 further comprises an extractor 404 for transferring information for creating a GMS message and a management information base (MIB) to an OIDInfo memory of FIG. 5, and a header file memory 406 for storing an SNMP interface header file used for communication with an application program, information to be managed by an application program 504 of FIG. 5, and GMS information.

The OIDInfo processor 402 provides a number of functions. First, when OIDInfo about management items is input from the agent 400, the OIDInfo processor 402 retrieves GMS information corresponding to information for communication between the agent 400 and the application program 504 from the OIDInfo memory 500 storing an OIDInfo data file, and provides the GMS information to the agent 400. Here, the information for communication comprises information about a port number, a message format, a communication type, a payload structure, and so on, for communication between the agent 400 and the application program 504. In an exemplary embodiment of the present invention, it is assumed that the interface between the agent 400 and the application program 504 is the GMS, however, the present invention is not limited thereto. Alternatively, other interfaces may be used.

FIG. 5 is a block diagram illustrating the SNMP agent illustrated in FIG. 4 and a total operation flow including a compile time and a run time in accordance with an embodiment of the present invention.

First, the agent 400 is used for processing the SNMP protocol with the manager 100, and transmits/receives a GMS message for communication with an application program 504 for actually maintaining and managing management items. When a network manager sends an SNMP request message including a protocol data unit (PDU) based on various preset formats to request an management item of a network device in which the agent 102 operates using the manager 100, an OID mapped to the management item included in the SNMP request message is sent to the OIDInfo processor 402. Then, the agent 400 receives, from the OIDInfo processor 402, GMS information corresponding to information about a port number, a format, and a payload structure for communicating with the application program 504. The agent 400 communicates with the application program 504 using the GMS information, and receives a result of processing the management item from the application program 504. Upon receiving the result of processing the management item from the application program 504, the agent 400 sends data of the result of processing the management item to the manger 100 through an SNMP response message.

Second, the agent 400 is further used in obtaining OIDInfo from the OIDInfo processor 402 and sending a trap PDU to the manager 100 when receiving a notification (trap) message from the application program 504.

To access the management item, the OIDInfo processor 402 reads, from the OIDInfo memory 500, an OIDInfo file storing information necessary to send a message to and receive a message from the application program 504. The OIDInfo processor 402 retrieves the OIDInfo file and delivers GMS information to the agent 400. The OIDInfo memory 500 stores OIDInfo library application programming interfaces (APIs) and OIDInfo data files. The OIDInfo library APIs and the OIDInfo data files are provided from the extractor 404.

The extractor 404 is used in generating an MIB file from an SNMP interface header file defined as the management item in the application program 504, generating an OIDInfo file required by the OIDInfo processor 402, and storing the MIB file and the OIDInfo file in the OIDInfo memory 500.

The SNMP interface header file 506 is a file in which a message identifier (ID), a port number, a message structure, and so on, are defined such that the agent 400 can obtain information managed in the application program 504. The SNMP interface header file 506 is defined in the application program 504 and is stored in the header file memory 406.

An exemplary operation of the SNMP agent 102 at the compile time will now be described with reference to FIGS. 5, 6 and 7.

A basic structure for creating an OIDInfo data file with information about a GMS message to be sent to the application program 504, and a process for generating OIDInfo data based on the structure in the extractor 404, will now be described.

Using the above-described method, the extractor 404 is used in generating data from the header file memory 406. The agent 400 uses an OIDInfo library capable of retrieving necessary information through an OIDInfo file and uses the information about the GMS message to be sent to the application program 504.

The compile operation of the SNMP agent 102 will now be described in greater detail with reference to FIG. 6. FIG. 6 illustrates an exemplary process for generating a data file in the extractor 404 of the SNMP agent 102 at the compile time in accordance with an embodiment of the present invention.

First, a developer of the SNMP agent 102 stores the SNMP interface header file 506 defining information to be managed through the application program 504 in the header file memory 406. Then, the extractor 404 reads the SNMP interface header file 506 from the header file memory 406 with the information to be managed, creates an MIB file in which a management item is defined, and stores the created MIB file in the MIB file memory 502. Moreover, the extractor 404 reads the SNMP interface header file 506 from the header file memory 406, creates an OIDInfo data file for generating a GMS message, and stores the OIDInfo data file in the OIDInfo memory 500.

Figure 7:
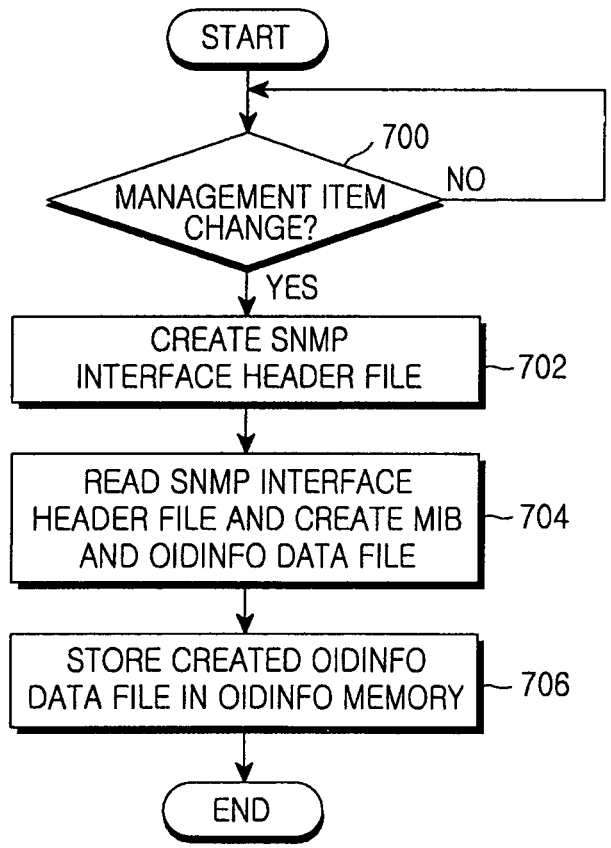
FIG. 7 is a flowchart illustrating an exemplary operation of the SNMP agent illustrated in FIG. 4 at the compile time in accordance with an embodiment of the present invention.

FIG. 7 is a flowchart illustrating an exemplary operation of the SNMP agent 102 at the compile time in accordance with an embodiment of the present invention.

When the developer has requested a change of a management item of the SNMP agent 102 in step 700, the operation proceeds to step 702 in which the application program 504 creates the SNMP interface header file 506 for a changed management item on the basis of information input by the developer and stores the created SNMP interface header file 506 in the header file memory 406.

In step 704, the extractor 404 reads the SNMP interface header file and creates an MIB and an OIDInfo data file. Among the MIB and OIDInfo data file created in step 704, the MIB is stored in the MIB file memory 502 and the created OIDInfo data file is stored in the OIDInfo memory 500 in step 706.

Figure 6:
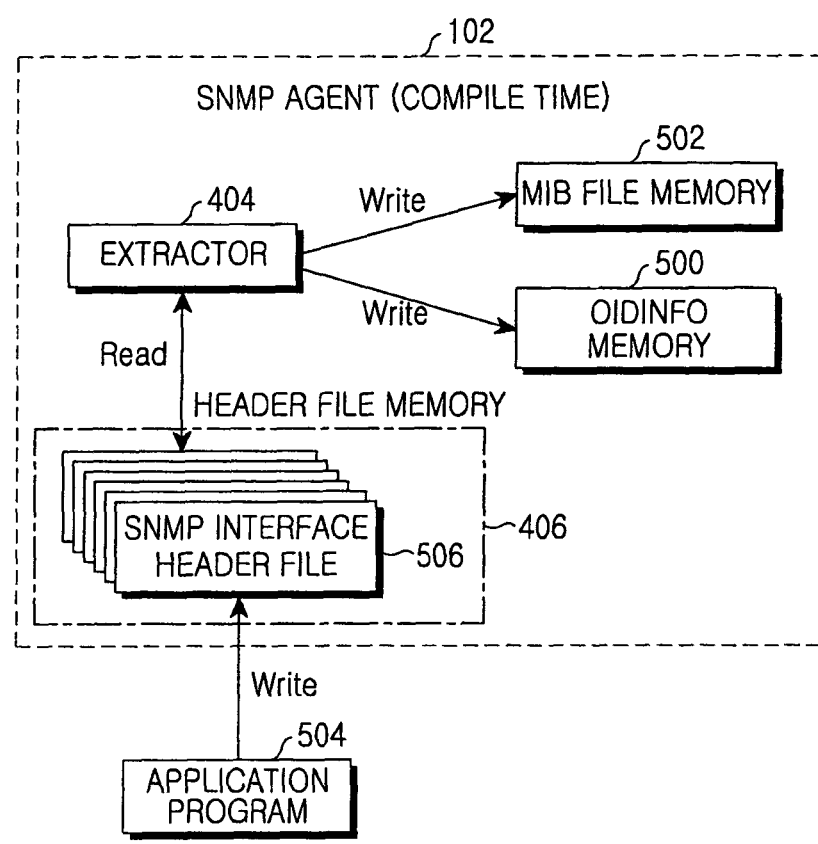
FIG. 6 is a block diagram illustrating an exemplary compile operation of the SNMP agent illustrated in FIG. 4 in accordance with an embodiment of the present invention.
Figure 8:
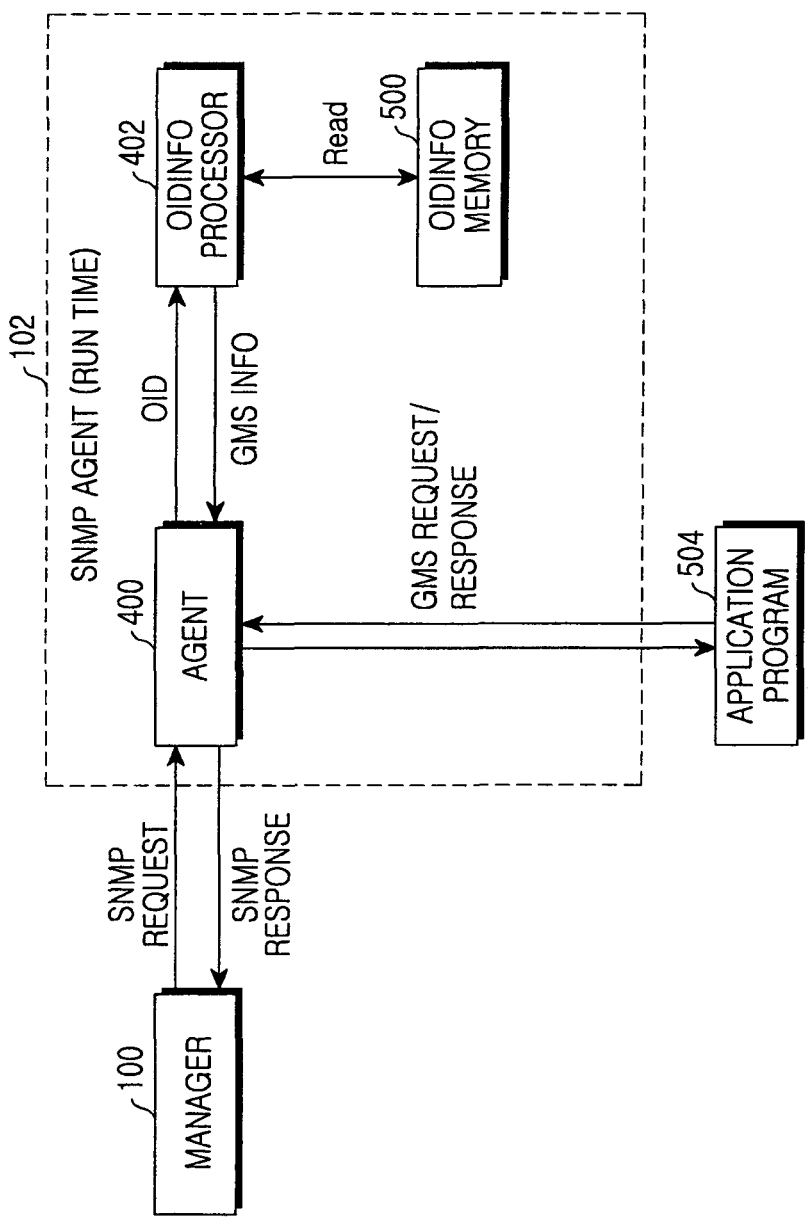
FIG. 8 illustrates an exemplary process for making an SNMP response at the run time in the SNMP agent illustrated in FIG. 4 using object identifier information generated at the compile time of FIG. 6 in accordance with an embodiment of the present invention.

FIG. 8 illustrates an exemplary process of the SNMP agent 102 at the run time using an OIDInfo data file generated at the compile time of FIG. 6.

Figure 10:
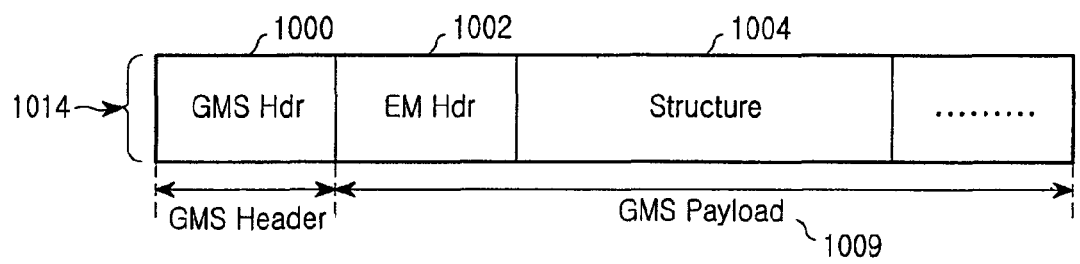
FIG. 10 illustrates an exemplary configuration of a general message service (GMS) protocol data unit (PDU) for communication between an agent and application programs in accordance with an embodiment of the present invention.

Communication between the agent 400 and the application program 504 of FIG. 8 uses a GMS (or object-oriented message service) interface. A payload 1009 of the GMS message as shown in FIG. 10 comprises a type of message for supporting SNMP communication between the agent 400 and the application program 504 and an EM_Interface_header 1002 indicating the number of structures repeated in the message payload 1009. This is described in greater detail below.

First, when the manager 100 sends an SNMP request message to the agent 400, the agent 400 sends OIDInfo within the SNMP request message to the OIDInfo processor 402. One reason why the agent 400 sends the OIDInfo to the OIDInfo processor 402 is that the agent 400 requires GMS information to communicate with the application program 504.

The OIDInfo processor 402 reads the GMS information on the basis of the received OID message, and sends the read GMS information to the agent 400. Then, the agent 400 communicates with the application program 504 on the basis of the GMS information. The agent 400 sends to the manager 100, a response to the SNMP request on the basis of a result of a response of the application program 504.

Now, an exemplary operation of the components of the SNMP agent 102 at the run time will be described with reference to FIG. 9.

Figure 9:
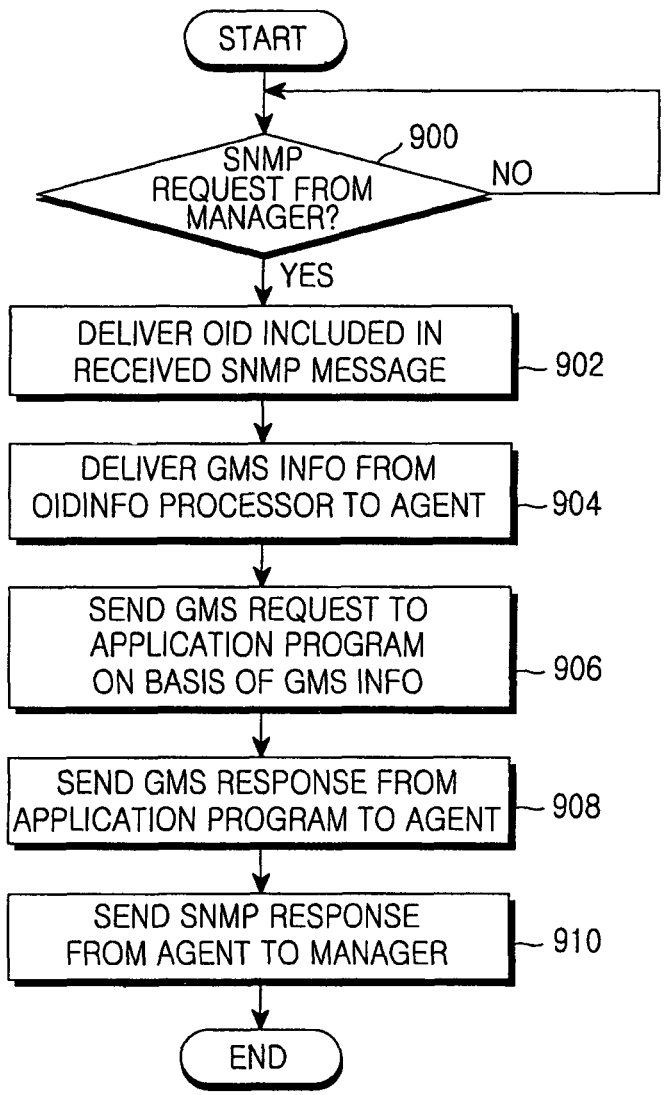
FIG. 9 is a flowchart illustrating an exemplary operation of the SNMP agent illustrated in FIG. 4 at the run time in accordance with an embodiment of the present invention.

FIG. 9 is a flowchart illustrating an operation of the SNMP agent 102 at the run time in accordance with an embodiment of the present invention.

In step 900, the agent 400 determines if an SNMP request has been received from the manager 100. If the SNMP request has been received in step 900, the agent 400 proceeds to step 902 to deliver an OID included in the SNMP request message received from the manager 100 to the OIDInfo processor 402.

In step 904, the OIDInfo processor 402 reads associated GMS information from the OIDInfo memory 500 on the basis of received OIDInfo, and delivers the GMS information to the agent 400. Here, the GMS information comprises information about a port number, a communication type, a data structure, and so on, of the application program 504 for communication between the agent 400 and the application program 504.

In step 906, the agent 400 receiving the GMS information sends to the application program 504, a request for data of a management item requested by the manager 100 on the basis of the GMS information. In step 908, the application program 504 sends data about the management item through a GMS response message.

In step 910, the agent 400 sends an SNMP response message to the manager 100 on the basis of the data about the management item corresponding to the response from the application program.

FIG. 10 illustrates an exemplary configuration of a GMS PDU for communication between the agent 400 and the application program 504. A GMS header 1000 is required to support SNMP communication between all software programs using SNMP. A GMS payload 1009 comprises an EM_Interface_header 1002 for a special header file to support SNMP communication between the agent 400 and the application program 504. The EM_Interface_header 1002 comprises four fields (described in greater detail below with reference to FIG. 11). The EM_Interface_header 1002 is used to support the SNMP communication between the agent 400 and the application program 504. A payload structure field 1004 comprises a field value of a payload necessary at the time of SNMP communication.

FIGS. 11 to 14 illustrate an exemplary PDU message configuration and configuration fields according to a type of message between the agent 400 and the application program 504 described in greater detail below.

First, the configuration and function of the respective fields will be briefly described.

A set of the GMS header (GMS Hdr) 1000, the EM_Interface_header 1002, and the structure field 1004 is referred to as one row 1014.

As described above, the EM_Interface_header 1002 comprised of the above-described four fields will now be described in greater detail. First, a msgType 1006 indicates a type of a message between the agent 400 and the application program 504, and a rowCount 1008 indicates the number of structures 1004 repeated in the payload at the time of Get, Set, and Get-Next operations for a table supporting a multi-RowTable. At the time of a Get-Bulk operation for all tables, the rowCount 1008 is used for the purpose equal to that of a Max-Repeat value of SNMP Get-Bulk. A response 1010 is used to report an occurrence error. A structId 1012 indicates a message ID additionally used within the application program 504, and is used as a relation ID for programmable loading data (PLD).

Additionally, the application program 504 copies a transactionId 1016 and a bsmId 1018 from a header 1000 of the GMS message received from the agent 400, creates a response message, and delivers the created response message to the agent 400 such that the agent 400 operates normally according to the response 1010 received from the application program 504.

Figure 11:
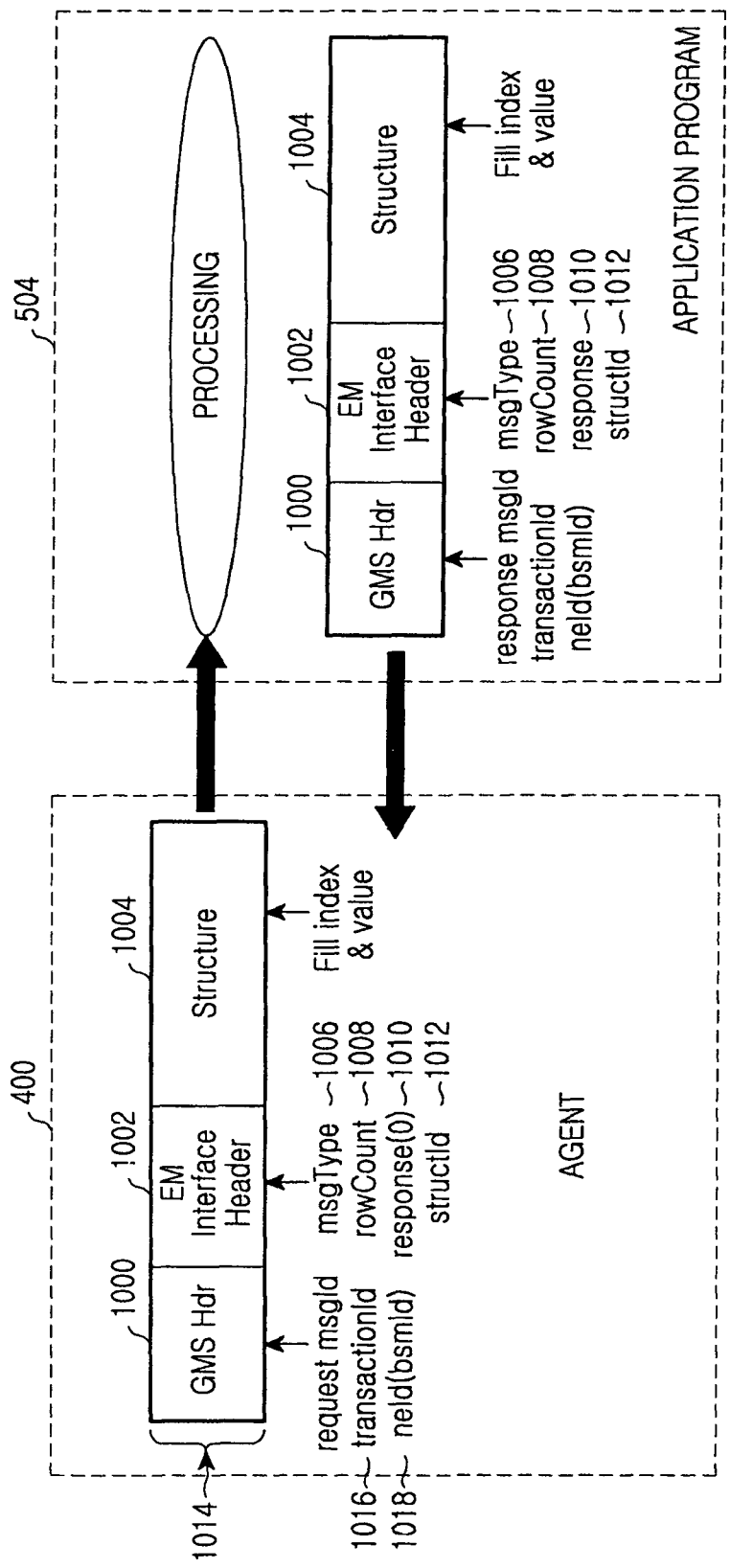
FIG. 11 illustrates an exemplary procedure for sending a Get/GetNext/GetFirst message from an agent to an application program and an operation associated with a response in accordance with an embodiment of the present invention.

FIG. 11 illustrates an exemplary procedure for sending a Get/GetNext/GetFirst request message from the agent 400 to the application program 504 and an operation associated with a response.

The agent 400 allocates a memory mapped to one row, inserts an index value received from the manager 100 into the GMS payload 1009, and delivers the GMS payload 1009 to the application program 504.

The application program 504 copies, to the memory, the row mapped to the index received from the agent 400 in an associated table, and sends a response to the agent 400. At this time, an MsgId is set to a ResponseId associated with a predefined structure. If a failure has occurred, an error value associated with the response 1010 of the EM_Interface_header 1002 is inserted and sent. At this time, the GMS payload 1009 is resent without modification.

In the case of GetNextRequest, the next row subsequent to an associated row is retrieved and delivered.

Figure 12:
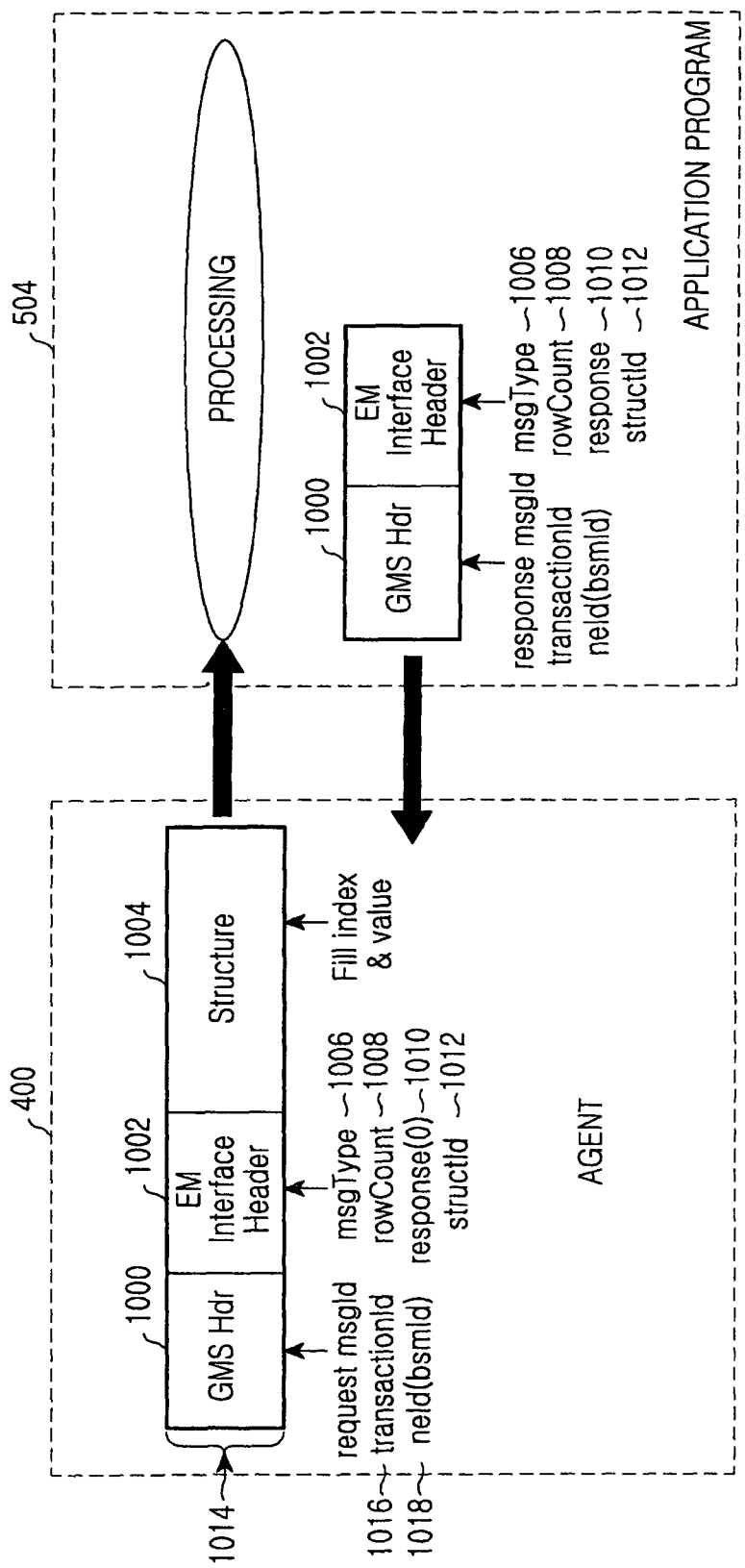
FIG. 12 illustrates an exemplary procedure for sending a PreSet/Set message from an agent to an application program and an operation associated with a response in accordance with an embodiment of the present invention.

FIG. 12 illustrates an exemplary procedure for sending a PreSet/SetRequest message from the agent 400 to the application program 504 and an operation associated with a response.

First, the PreSet/SetRequest message is sent from the agent 400 to the application program 504. The operation of PreSetRequest is substantially the same as that of GetRequest. Upon receiving PreSetRequest, the application program 504 fixes an associated row. Upon receiving a response to PreSetRequest from the application program 504, the agent 400 changes an attribute value for performing SetRequest and sends SetRequest to the application program 504.

Upon receiving a normal response from the application program 504, the agent 400 sends, to the manager 100, a response to the Set message. If a Fail message is received from the application program 504, the agent 400 sends the Fail message to the manager 100. When the time is exceeded, the agent 400 discards a Set packet.

In the case of SetRequest, a memory mapped to a row is allocated to the requested GMS payload 1009 and then the GMS payload 1009 is delivered. When the application program sends a response, the agent 400 sends only the EM_Interface_header 1002.

Figure 13:
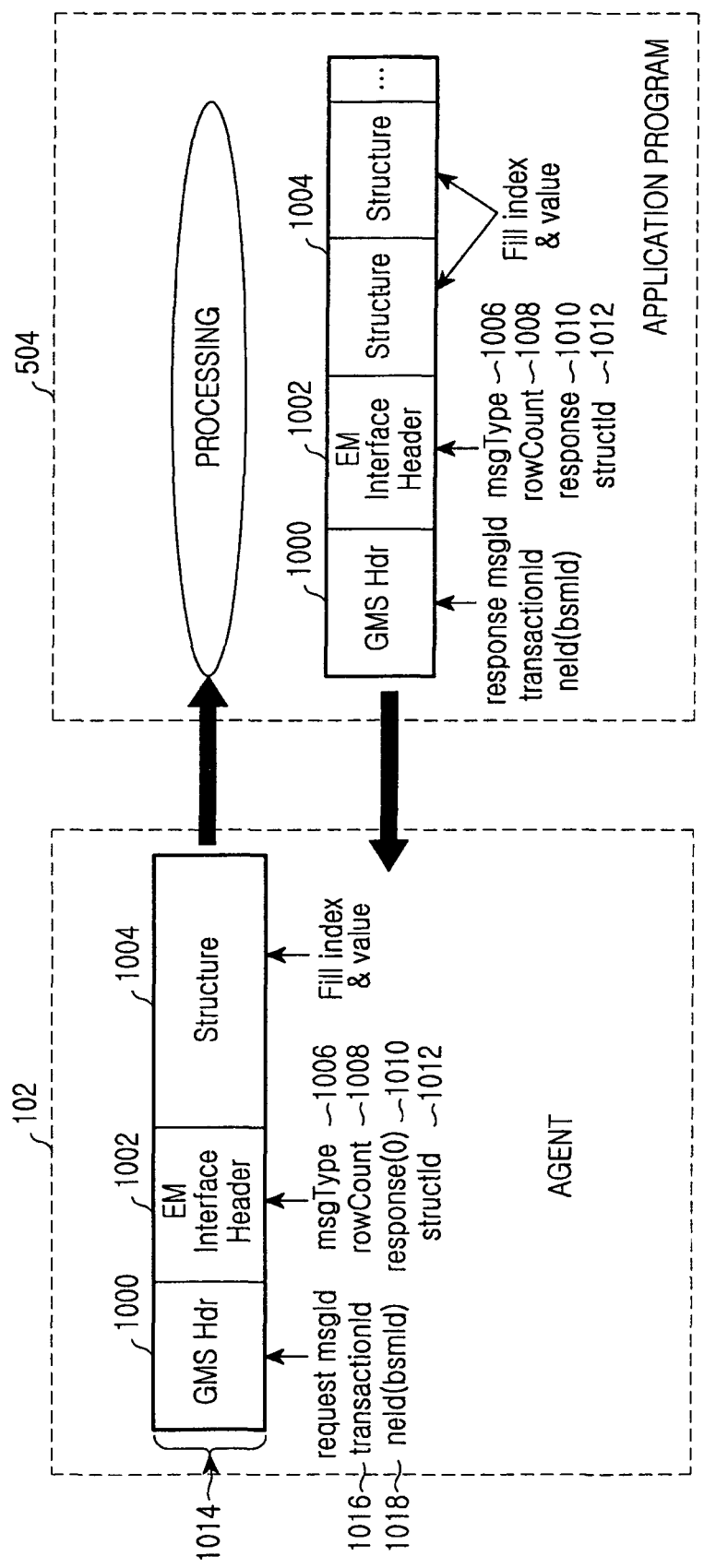
FIG. 13 illustrates an exemplary procedure for sending a GetBulk message from an agent to an application program and an operation associated with a response in accordance with an embodiment of the present invention.

FIG. 13 illustrates an exemplary procedure for sending a GetBulkRequest message for reading a number of object values from the agent 400 to the application program 504 and an operation associated with a response.

In the case of GetBulkRequest, a number of memories corresponding to a value of the rowCount (Max-Repeat) 1008 of the EM_Interface_header 1002 are generated from an associated row. If the rowCount value is "0" for example, the entire table is delivered.

If the agent 400 has sent to the application program 504 a request in which the rowCount value is "3" for example, only a memory mapped to one row is allocated in relation to the payload 1009 of a requested GMS for sending an index indicating the beginning. Then, the application program 504 deletes the above-described memory, allocates a number of memories corresponding to a value of the rowCount 1008, copies information, and sends the copied information to the agent 400. The memory is deleted by the agent 400.

Figure 14:
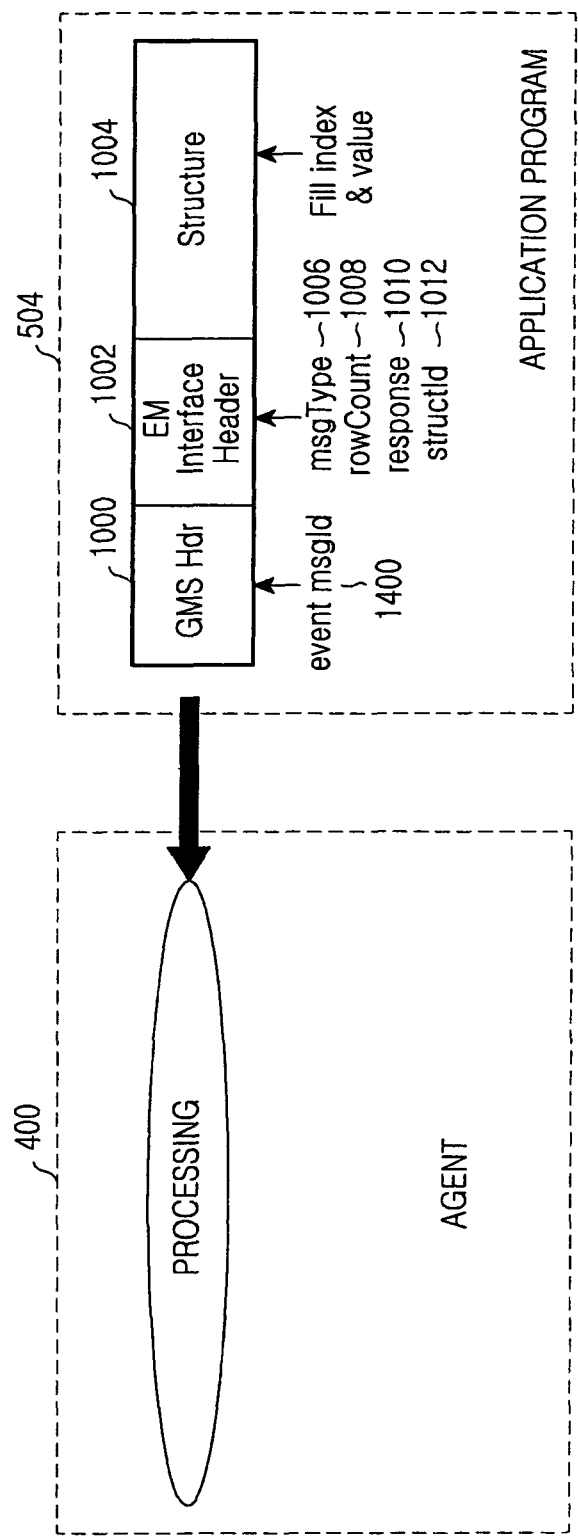
FIG. 14 illustrates an exemplary procedure for sending a Notification (Trap) message from an agent to an application program and an operation associated with a response in accordance with an embodiment of the present invention.

FIG. 14 illustrates an exemplary procedure for sending a Notification (Trap) message from the agent 400 to the application program 504 and an operation associated with a response.

To process notification, preferably a preset structure must be defined and a single message ID is provided. The application program 504 sets the msgType of the EM_Interface_header 1002 to EM_NOTIFICATION, fills a preset value of an msgId 1400 in the GMS header 1000, fills structure information in the payload 1009, and sends a message to the agent 400.

Now, an exemplary OIDInfo data file stored in the OIDInfo memory 500 will be described.

Figure 15A:
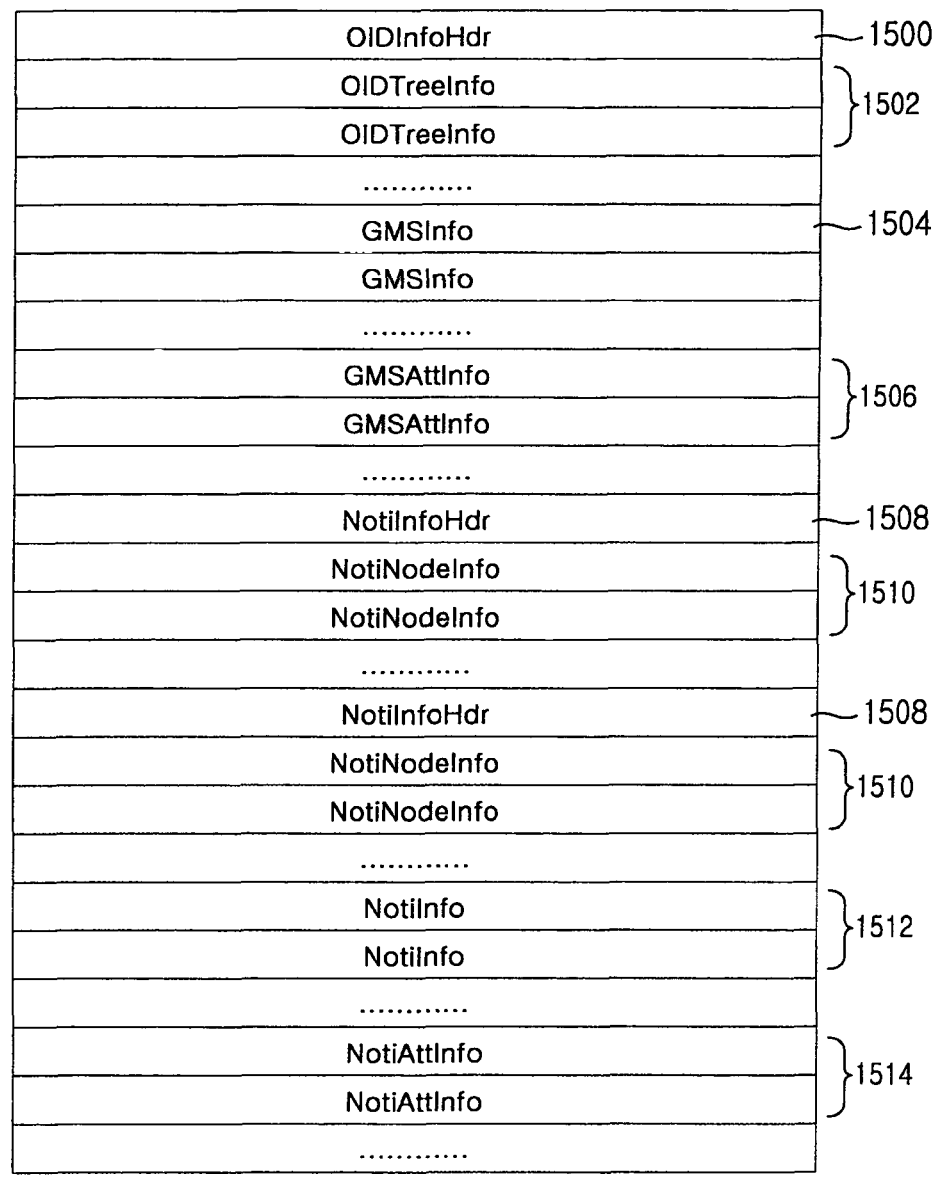
FIG. 15A schematically illustrates exemplary items comprising an object identifier information file in accordance with an embodiment of the present invention.

FIGS. 15A and 15B schematically illustrate tables in which an OIDInfo data file is mapped to a memory (not illustrated) in the OIDInfo memory 500.

FIG. 15A schematically illustrates exemplary items comprising an object identifier information file. The respective items will be described with reference to FIG. 15B.

FIG. 15B is a table illustrating exemplary information comprising the items illustrated in FIG. 15A.

First, an OID information header (OIDInfoHdr) 1500 indicates a data structure of a payload storing basic information of the OIDInfo. This structure information comprises a version and generation date of the OIDInfo, a default OID, an offset value for indicating the highest node of OIDTreeInfo 1502 serving as structure information of each node of an OID tree, and an offset value for indicating a NotiInfoHdr 1508 used for retrieving notification information.

A detailed description of fields comprising the OIDInfoHdr 1500 is shown in Table 1 by way of example.

TABLE 1

| Field Name | Description |
| --- | --- |
| Version | This indicates a version of an OIDInfo file. |
| Date | This indicates a generation date of an OIDInfo file. |
| DefaultOID | This is included in all OIDs, and is excluded at the time of a search inside the OIDInfo. |
| OIDTreeInfoOffset | This indicates an offset value for indicating the highest OIDTreeInfo in OIDTreeInfo fields. |
| NotiInfoHdrOffset | This indicates an offset value for indicating the highest NotiInfoHdr in NotiInfoHdr fields to retrieve notification information using a message ID. |

The OIDTreeInfo 1502 comprises tree node information and is used for a tree search. The OIDTreeInfo 1502 is used for expressing a group and expressing one node of the OIDTreeInfo 1502 associated with a scalar object and a table object. This structure comprises an ObjectID indicating an OID of an MIB, a node type (NodeType), and four offsets.

The ObjectID indicates an OID of the current node of the MIB rather than a total OID. The NodeType is used to determine if the current node is a group object, a scalar object, or a table object. The offset included in the OIDTreeIOnfo comprises an offset indicating higher OIDTreeInfo and an offset indicating GMSInfo with information about the GMS and the structure.

A description of fields comprising the OIDTreeInfo 1502 is shown in Table 2 by way of example.

TABLE 2

| Field Name | Description |
|---|---|
| objectId | This indicates an OID of an associated tree node. An OID value is an integer for indicating an OID of an associated node rather than a total OID. |
| nodeType | This is used to determine if a type of the tree node is a scalar, table, or group. |
| upOIDTreeInfoOffset | This is an offset value indicating higher OIDTreeInfo in a tree. |
| nextOIDTreeInfoOffset | This is an offset value for indicating the next OIDTreeInfo of an identical level in an OID tree. |
| gmsInfoOffset | This is an offset value with GMS information when a node type is a scalar or table. If the nodeType is a scalar or table and the gmsInfoOffset is 0 or if the nodeType is a group and the gmsInfoOffset is not 0, it means that the extractor has wrongly generated an OIDInfo file. |

The GMS information (GMSInfo) 1504 comprises GMS header information and payload information for delivering a message to the application program 504. This structure is divided into fields whose meanings vary with the structType and common fields. An OID is mapped to a group including a scalar or an MIB table generated using the structure, and includes a common default OID (or enterprise OID). A structname indicates a name created when the structure is defined. The structType is used to indicate 6 different structure types, and a payloadType is a field for indicating if Set, Get, and Get-Next are possible for multiple rows using the structure.

A requestMsgId, responseMsgId, and portNumber indicate GMS header information. A numberOfIndex indicates the number of structure indices. A numberOfField indicates the number of total structure fields rather than the number of attributes of an MIB table. A payloadSize indicates a total structure size for computing a size of the GMS payload. A pldRelationId indicates a relation ID of the PLD, and a masterTableOffset is an offset for indicating a master table when the structType is a sub-table. A nextGMSInfoOffset is a reserved field to be used later, and is a field whose purpose currently is not defined. Finally, a firstGMSAttInfoOffset is an offset for indicating the first GMSAttInfo indicating field information of the structure.

Fields of the GMSInfo 1504 are used for different purposes according to the structType. The requestMsgId, responseMsgId, and portNumber are commonly used as the GMS header information. The purposes of the nextGMSInfoOffset and firstGMSAttInfoOffset are substantially identical between all structType fields. In Table 3 by way of example, the structType and the purposes of fields varying with the structType will be described.

TABLE 3

| Type | Description |
|---|---|
| SType_Scalar (scalar) | This indicates a structure including scalars. |
| SType_StaticTable (static table) | This table indicates a static table for managing data in the application program. |
| SType_AgentDyTable (agent dynamic table) | This table indicates a dynamic table for managing data in the agent. |
| SType_AppDyTable (application dynamic table) | This table indicates a dynamic table for managing data in the application program. |
| SType_PLD (pld) | This table indicates a PLD table. Get, Get-Next, or Get-Bulk allows the agent to obtain data through RSI, and only Set is sent to the application program. |
| SType_SubTable (sub_table, array) | This indicates GMSInfo extended by use of an array. |

Now, exemplary purposes of the fields of the GMSInfo 1504 according to the structType will be described.

First, the purpose of each field of the GMSInfo 1504 when the structType is the scalar is shown in Table 4 by way of example.

TABLE 4

| Field Name | Description | Comment |
|---|---|---|
| OID | This indicates an OID string of up to a group including scalar nodes. | |
| structname | This indicates a string of a structure name defined in an SNMP interface header file. | This has the identical meaning regardless of structType. |
| structType | This is a field indicating a structure type of GMSInfo. The structure type is a scalar. (structType = SType_Scalar) | |
| payloadType | This is a field indicating if Set, Get, and Get-Next are simultaneously possible for multiple rows using the structure. This can be used only when an undo function is provided from the application. There are two types, a single row type and a multirow type. | This has the identical meaning regardless of structType. |
| requestMsgId | This indicates a request message ID inserted into a GMS header when the agent sends a request to the application. | This has the identical meaning regardless of structType. |
| responseMsgId | This indicates a response message ID inserted into a GMS header when the application sends a response to the agent. | This has the identical meaning regardless of structType. |
| portNumber | This indicates a port number in which the application receives a message from the agent. | This has the identical meaning regardless of structType. |

TABLE 4-continued

| Field Name | Description | Comment |
| --- | --- | --- |
| numberOfIndex | This indicates the number of structure indices. In this case, the number of structure indices is 0. An index does not exist when scalars are gathered. | |
| numberOfField | This indicates the number of fields of the structure defined in an SNMP interface header file. The numberOfField includes the number of index fields. The structure is defined as in the following:<br>struct {<br>    int A;//index<br>    int B;//index<br>    int C;<br>    int D[3];<br>    int E[4];<br>} AA;<br>In the above-described case, the numberOfField indicates 5. | |
| payloadSize | This indicates a total size of the structure. | |
| pldRelationId | This is unused and has a zero value. | |
| masterTableOffset | This is unused and has a zero value. | |
| nextGMSInfoOffset | This is an undefined field and is reserved to be used later. | This has the identical meaning regardless of structType. |
| firstGMSAttInfoOffset | This indicates an offset value for indicating the first GMSAttInfo indicating field information of the structure. | This has the identical meaning regardless of structType. |

Next, the purpose of each field of the GMSInfo 1504 when the structType is the static-table is shown in Table 5 by way of example.

TABLE 5

| Field Name | Description | Comment |
| --- | --- | --- |
| OID | This indicates an OID string of up to a table entry of an MIB. | |
| structname | This indicates a string of a structure name defined in an SNMP interface header file. | This has the identical meaning regardless of structType. |
| structType | This is a field indicating a structure type of GMSInfo. The structure type is a static table. (structType = SType_StaticTable) | |
| payloadType | This is a field indicating if Set, Get, and Get-Next are simultaneously possible for multiple rows using the structure. This can be used only when an undo function is provided from the application. There are two types, a single row type and a multirow type. | This has the identical meaning regardless of structType. |
| requestMsgId | This indicates a request message ID inserted into a GMS header when the agent sends a request to the application. | This has the identical meaning regardless of structType. |
| responseMsgId | This indicates a response message ID inserted into a GMS header when the application sends a response to the agent. | This has the identical meaning regardless of structType. |
| portNumber | This indicates a port number in which the application receives a message from the agent. | This has the identical meaning regardless of structType. |
| numberOfIndex | This indicates the number of structure indices. | |
| numberOfField | This indicates the number of fields of the structure defined in an SNMP interface header file. If the structure includes an array, the number of fields indicating the array is included. (The MIB does not have a field indicating an array.) | |

TABLE 5-continued

| Field Name | Description | Comment |
| --- | --- | --- |
| payloadSize | This indicates a total size of the structure. | |
| pldRelationId | This is unused and has a zero value. | |
| masterTableOffset | This is unused and has a zero value. | |
| nextGMSInfoOffset | This is an undefined field and is reserved to be used later. | This has the identical meaning regardless of structType. |
| firstGMSAttInfoOffset | This indicates an offset value for indicating the first GMSAttInfo indicating field information of the structure. | This has the identical meaning regardless of structType. |

Next, the purpose of each field of the GMSInfo 1504 when the structType is the agent-dynamic-table is shown in Table 6 by way of example.

TABLE 6

| Field Name | Description | Comment |
| --- | --- | --- |
| OID | This indicates an OID string of up to a table entry of an MIB. | |
| structname | This indicates a string of a structure name defined in an SNMP interface header file. | This has the identical meaning regardless of structType. |
| structType | This is a field indicating a structure type of GMSInfo. The structure type is an agent dynamic table. (structType = SType_AgentDyTable) | |
| payloadType | This is a field indicating if Set, Get, and Get-Next are simultaneously possible for multiple rows using the structure. This can be used only when an undo function is provided from the application. There are two types, a single row type and a multirow type. | This has the identical meaning regardless of structType. |
| requestMsgId | This indicates a request message ID inserted into a GMS header when the agent sends a request to the application. | This has the identical meaning regardless of structType. |
| responseMsgId | This indicates a response message ID inserted into a GMS header when the application sends a response to the agent. | This has the identical meaning regardless of structType. |
| portNumber | This indicates a port number in which the application receives a message from the agent. | This has the identical meaning regardless of structType. |
| numberOfIndex | This indicates the number of structure indices. | |
| numberOfField | This indicates the number of fields of the structure defined in an SNMP interface header file. (RowStatus exists in the MIB, but a field mapped to the RowStatus is not defined when the structure is defined. GMSAttInfo of the OIDInfo does not exist. The agent manages the RowStatus.) | |
| payloadSize | This indicates a total size of the structure. | |
| pldRelationId | This is unused and has a zero value. | |
| masterTableOffset | This is unused and has a zero value. | |
| nextGMSInfoOffset | This is an undefined field and is reserved to be used later. | This has the identical meaning regardless of structType. |
| firstGMSAttInfoOffset | This indicates an offset value for indicating the first GMSAttInfo indicating field information of the structure. | This has the identical meaning regardless of structType. |

Next, the purpose of each field of the GMSInfo 1504 when the structType is the application-dynamic-table is shown in Table 7 by way of example.

TABLE 7

| Field Name | Description | Comment |
| --- | --- | --- |
| OID | This indicates an OID string of up to a table entry of an MIB. | |
| structname | This indicates a string of a structure name defined in an SNMP interface header file. | This has the identical meaning regardless of structType. |
| structType | This is a field indicating a structure type of GMSInfo. The structure type is an application dynamic table. | |
| payloadType | This is a field indicating if Set, Get, and Get-Next are simultaneously possible for multiple rows using the structure. This can be used only when an undo function is provided from the application. There are two types, a single row type and a multirow type. | This has the identical meaning regardless of structType. |
| requestMsgId | This indicates a request message ID inserted into a GMS header when the agent sends a request to the application. | This has the identical meaning regardless of structType. |
| responseMsgId | This indicates a response message ID inserted into a GMS header when the application sends a response to the agent. | This has the identical meaning regardless of structType. |
| portNumber | This indicates a port number in which the application receives a message from the agent. | This has the identical meaning regardless of structType. |
| numberOfIndex | This indicates the number of structure indices. | |
| numberOfField | This indicates the number of fields of the structure defined in an SNMP interface header file. Because a field mapped to RowStatus is included in the structure, the number of fields is included in the case of an application-dynamic-table. GMSAttInfo of the OIDInfo exists. The application manages the RowStatus. | |
| payloadSize | This indicates a total size of the structure. | |
| pldRelationId | This is unused and has a zero value. | |
| masterTableOffset | This is unused and has a zero value. | |
| nextGMSInfoOffset | This is an undefined field and is reserved to be used later. | This has the identical meaning regardless of structType. |
| firstGMSAttInfoOffset | This indicates an offset value for indicating the first GMSAttInfo indicating field information of the structure. | This has the identical meaning regardless of structType. |

Next, the purpose of each field of the GMSInfo 1504 when the structType is the PLD is shown in Table 8 by way of example.

TABLE 8

| Field Name | Description | Comment |
| --- | --- | --- |
| OID | This indicates an OID string of up to a table entry of an MIB. | |
| structname | This indicates a string of a structure name defined in an SNMP interface header file. | This has the identical meaning regardless of structType. |
| structType | This is a field indicating a structure type of GMSInfo. The structure type is a PLD. | |
| payloadType | This is a field indicating if Set, Get, and Get-Next are simultaneously possible for multiple rows using the structure. This can be used only when an undo function is provided from the application. There are two types, a single row type and a multirow type. | This has the identical meaning regardless of structType. |
| requestMsgId | This indicates a request message ID inserted into a GMS header when the | This has the identical meaning |

TABLE 8-continued

| Field Name | Description | Comment |
|---|---|---|
| | agent sends a request to the application. | regardless of structType. |
| responseMsgId | This indicates a response message ID inserted into a GMS header when the application sends a response to the agent. | This has the identical meaning regardless of structType. |
| portNumber | This indicates a port number in which the application receives a message from the agent. | This has the identical meaning regardless of structType. |
| numberOfIndex | This indicates the number of structure indices. | |
| numberOfField | This indicates the number of fields of the structure. When the structure includes an array, the number of fields of the array is included. (A field of the array is not in the MIB.) For example, when the number of fields is 3, a numberOfField value is 3. | |
| payloadSize | This indicates a total size of the structure. | |
| pldRelationId | This indicates a relation ID of the PLD. | |
| masterTableOffset | This is unused and has a zero value. | |
| nextGMSInfoOffset | This is an undefined field and is reserved to be used later. | This has the identical meaning regardless of structType. |
| firstGMSAttInfoOffset | This indicates an offset value for indicating the first GMSAttInfo indicating field information of the structure. | This has the identical meaning regardless of structType. |

Next, the purpose of each field of the GMSInfo 1504 when the structType is the sub-table is shown in Table 9 by way of example.

TABLE 9

| Field Name | Description | Comment |
|---|---|---|
| OID | This indicates an OID string of up to a table entry of an MIB. | |
| structname | This indicates a string of a structure name defined in an SNMP interface header file. | This has the identical meaning regardless of structType. |
| structType | This is a field indicating a structure type of GMSInfo. The structure types are scalar, static-table, agent-dynamic-table, application-dynamic-table, pld, and sub-table. | |
| payloadType | This is a field indicating if Set, Get, and Get-Next are simultaneously possible for multiple rows using the structure. This can be used only when an undo function is provided from the application. There are two types, a single row type and a multirow type. | This has the identical meaning regardless of structType. |
| requestMsgId | This indicates a request message ID inserted into a GMS header when the agent sends a request to the application. | This has the identical meaning regardless of structType. |
| responseMsgId | This indicates a response message ID inserted into a GMS header when the application sends a response to the agent. | This has the identical meaning regardless of structType. |
| portNumber | This indicates a port number in which the application receives a message from the agent. | This has the identical meaning regardless of structType. |
| numberOfIndex | This indicates the number of indices of the sub-table rather than indices of the master table in the MIB. A numberOfIndex value indicates order of an array. | |
| numberOfField | This indicates the number of fields for indicating an index and value of an | |

TABLE 9-continued

| Field Name | Description | Comment |
|---|---|---|
| | extended table when an extension is made by an array. For example, a numberOfField value may be 2. | |
| payloadSize | This indicates a size of type information defining an array. | |
| pldRelationId | This is unused and has a zero value. | |
| masterTableOffset | This indicates an original master table including an array indicating a sub table. | |
| nextGMSInfoOffset | This is an undefined field and is reserved to be used later. | This has the identical meaning regardless of structType. |
| firstGMSAttInfoOffset | This indicates an offset value for indicating the first GMSAttInfo indicating field information of the structure. | This has the identical meaning regardless of structType. |

Field information inserted in the payload can be found when the GMSAttInfo indicated by the firstGMSAttInfoOffset are sequentially retrieved.

As the field and structure for the GMSInfo 1504 have been described, a structure of the GMSAttInfo 1506 will now be described. The GMSAttInfo 1506 indicates structure field information to be inserted into a GMS payload. Elements of the GMSAttInfo 1506 indicating respective structure fields are connected to each other according to offsets. The offset value for the last GMSAttInfo is "0".

In the order of the GMSAttInfo 1506, the GMSAttInfo indicating the index appears first, and the GMSAttInfo indicating the array appears last when the structure includes the array.

Indices are arranged in order of OIDs and also values are arranged in order of OIDs. Meanings of the fields of the GMSAttInfo differ according to a structType of the GMSInfo and a fieldType of the GMSAttInfo. First, the fieldType determining a type of the GMSAttInfo will be described. Exemplary purposes of fields that differ according to the fieldType are shown in Table 10 by way of example.

TABLE 10

| Type | Description | Comment |
|---|---|---|
| FType_ScalarValue (scalar value) | This GMSAttInfo indicates a scalar value. | |
| FType_TableValue (table value) | This GMSAttInfo indicates an attribute value of a table. | |
| FType_TableAndIndex (table and index) | This GMSAttInfo indicates an index value of a table. | |
| FType_TableAndArray (table and array) | This GMSAttInfo indicates a field defined by an array when a structure is defined. | |
| FType_ArrayAndIndex (array and index) | This GMSAttInfo indicates an index field when the structType of the higher GMSInfo is a sub table. If an array and index field type appears when the structType is not a sub-table, it means that the extractor has wrongly configured an OIDInfo file. | |

Fields of the GMSAttInfo 1506 when the structType is not a sub-table and the fieldType is a scalar value, a table value, or a table and index are shown in Table 11 by way of example.

TABLE 11

| Field Name | Description | Comment |
|---|---|---|
| objectId | This indicates an OID of a scalar or table attribute. | |
| attName | This indicates a string of a field name of a structure defined in an SNMP interface header file. | |
| asnType | This field indicates a syntax type expressed in the MIB. | |
| accessType | This field indicates an access type expressed in the MIB. | |
| fieldType | This indicates a field type (e.g., a scalar value, a table value, or a table and index). | |
| attType | This indicates a C data type defined in the structure information. | |
| attSize | This indicates a field size. | |
| startOffset | This indicates a start offset for the field in a GMS payload, and indicates a start offset for the beginning of the structure information. | |
| subTable | This is unused and has a zero value. | |
| maxDimensionValue | This is unused and has a zero value. | |
| nextAttInfoOffset | This indicates an offset value for indicating the next GMSAttInfo. | This has the identical meaning regardless of fieldType. |

Fields of the GMSAttInfo 1506 when the structType is not a sub-table and the fieldType is a table and array are shown in Table 12 by way of example.

TABLE 12

| Field Name | Description | Comment |
|---|---|---|
| objectId | This is unused because an extension to a table indicating an array has been made. An objectId value is set to 0. | |
| attName | This indicates a string of a field name of a structure defined in an SNMP interface header file. | |
| asnType | This is fixed to ASN_Null. | |
| accessType | This is fixed to ACType_NotAccessible.. | |
| fieldType | This indicates a field type (table and array). | |
| attType | This indicates a C data type defined in the structure information. | |
| attSize | This indicates a field size, and indicates a total size of a field indicating an array. (For example, attSize = 200 if the field is defined as "int a[10][5];". | |
| startOffset | This indicates a start offset for the field in a GMS payload. | |
| subTable | This indicates an offset value for indicating GMSInfo extended by the array. | |
| maxDimensionValue | This is unused and has a zero value. | |
| nextAttInfoOffset | This indicates an offset value for indicating the next GMSAttInfo. | This has the identical meaning regardless of fieldType. |

Fields of the GMSAttInfo 1506 when the structType is not a sub-table and the fieldType is an array and index are shown in Table 13 by way of example.

TABLE 13

| Field Name | Description | Comment |
|---|---|---|
| objectId | This indicates an OID in the MIB. | |
| attName | This is a field name created when the MIB is generated. | |
| asnType | This is always ASN_Unsigned32. (The value starts from 0.) | |
| accessType | This is fixed to ACType_NotAccessible. | |
| fieldType | This indicates a field type (array and index). | |
| attType | This indicates a C data type defined in the structure information. In this case, the attType is always AttType_Int. | |
| attSize | This is always 4 (because an int size is 4). | |
| startOffset | This is unused and has a zero value. | |
| subTable | This is unused and has a zero value. | |
| maxDimensionValue | This indicates the maximum value for the index, and determines an array size. | |
| nextAttInfoOffset | This indicates an offset value for indicating the next GMSAttInfo. | This has the identical meaning regardless of fieldType. |

Fields of the GMSAttInfo 1506 when the structType is not a sub-table and the fieldType is a table value are shown in Table 14 by way of example.

TABLE 14

| Field Name | Description | Comment |
|---|---|---|
| objectId | This indicates an OID in the MIB. | |
| attName | This is an attribute name created when the MIB is generated. | |
| asnType | This field indicates a syntax type expressed in the MIB. | |
| accessType | This field indicates an access type expressed in the MIB. | |
| fieldType | This indicates a field type (table value). | |
| attType | This indicates a C data type defined in the structure information. | |
| attSize | This indicates a field size. | |
| startOffset | This indicates a start offset for an array start in the GMS payload. This has the same value as the case where the structType is not the sub-table and the fieldType is the table and array. | |

TABLE 14-continued

| Field Name | Description | Comment |
|---|---|---|
| subTable | This is unused and has a zero value. | |
| maxDimensionValue | This is unused and has a zero value. | |
| nextAttInfoOffset | This indicates an offset value for indicating the next GMSAttInfo. | |

A NotiInfoHdr 1508 of FIGS. 15A and 15B is structure information used inside the OIDInfo processor 402 to obtain notification information using a message ID. A method for retrieving the notification information may use one or two message IDs.

The NotiInfoHdr 1508 comprises a field indicating the number of NotiNodeInfo fields 1510 and an offset indicating the first NotiNodeInfo 1510. A description of the fields of the NotiInfoHdr 1508 is shown in Table 15 by way of example.

TABLE 15

| Field Name | Description | Comment |
|---|---|---|
| numberOfNotiNodeInfo | This indicates the number of NotiNodeInfo fields sequentially arranged in order of message IDs. The numberOfNotiNodeInfo field is used to retrieve the NotiNodeInfo with an associated message ID. | |
| firstNotiNodeInfoOffset | This indicates an offset value of the first NotiNodeInfo of the | |

TABLE 15-continued

| Field Name | Description | Comment |
|---|---|---|
| | NotiNodeInfo fields sequentially arranged. | |

The NotiNodeInfo 1510 of FIG. 15 comprises a field for storing a message ID, a notiNodeType for distinguishing a type of the NotiNodeInfo, a sub NotiInfoHdrOffset for indicating a sub NotiInfoHdr, and a notiInfoOffset for indicating NotiInfo 1512 with notification information.

The NotiNodeInfo 1510 is structure information used to retrieve associated notification information using a message ID. The NotiNodeInfo 1510 is arranged in the OIDInfo data file memory 500 in order of message IDs. The OIDInfo processor 402 can retrieve associated notification information using the NotiNodeInfo 1510 and the NotiInfoHdr 1508.

First, when one message ID is mapped to one notification information element, a binary search algorithm is performed using the numberOfNotiNodeInfo and the firstNotiInfoOffset of the NotiInfoHdr. Using the algorithm, associated NotiNodeInfo 1510 is searched. This is possible because the NotiNodeInfo 1510 is arranged in order of message IDs.

An SNMP notification message is created using NotiInfo 1512 indicated by a notiInfoOffset of the NotiNodeInfo 1510.

Second, when two message IDs are mapped to one notification information element, the NotiNodeInfo 1510 is searched using the above-described method. In this case, the notiNodeType of the NotiNodeInfo 1510 is a multi notification node. The subNotiInfoHdrOffset indicates a sub NotiInfoHdr 1508.

A substantially identical algorithm is repeated using the second message ID. Using the algorithm, the NotiNodeInfo 1510 is searched. An SNMP notification message is created using the NotiInfo indicated by the notiInfoOffset of the NotiNodeInfo 1510.

A description of the above-described fields is shown in Table 16 by way of example.

TABLE 16

| Field Name | Description | Comment |
|---|---|---|
| notiMsgId | This indicates a message ID for retrieving notification info. | |
| notiNodeType | This indicates a type of NotiNodeInfo. There are three types, a single notification node, a multi notification node, and a sub notification node. The single notification node corresponds to the case where one message ID is mapped to one notification. The multi notification node corresponds to the case where two message IDs are mapped to notification info. The multi notification node is the type of NotiNodeInfo searched using the first message ID. The sub notification node is the type of NotiNodeInfo searched using the second message ID. | |
| subNotiInfoHdrOffset | This is an offset for indicating the sub NotiInfoHdr when the notiNodeInfoType is the multi notification node. An offset value is 0 when the notiNodeInfoType is the single notification node or the sub notification node. | |
| notiInfoOffset | This is an offset for indicating the NotiInfo when the notiNodeInfoType is the single notification node or the multi notification node. An offset value is 0 when the notiNodeInfoType is the multi notification node. | |

Next, the NotiInfo 1512 will now be described. The NotiInfo 1512 comprises a notiInfoType for distinguishing a notification type, a numberOfNotiField for indicating the number of notification structure fields defined in the SNMP interface header file, and the first offset of message field information.

First, the notiInfoType is shown in Table 17 by way of example.

TABLE 17

| Type | Description | Comment |
| --- | --- | --- |
| NItype__CommonNoti | This indicates common notification to be delivered from the agent only to the manager. | |
| NIType__InformNoti | After giving the notification, the agent waits an inform message to be received. If the inform message is not received from the manager, the agent performs a preset process. | |

Fields comprising the NotiInfo 1512 are shown in Table 18 by way of example.

TABLE 18

| Field Name | Description | Comment |
| --- | --- | --- |
| NotiOID | This indicates an OID of notification defined in the MIB. | |
| NotiInfoType | This indicates a type of notification for processing an inform message. | |
| NumberOfNotiField | This indicates the number of notification structure fields defined in the SNMP interface header file. | |
| FirstNotiAttInfoOffset | This is an offset for indicating the first NotiAttInfo with notification structure field information defined in the SNMP interface header file. | |

Next, the NotiAttInfo 1514 corresponding to the last structure information will be descried. The NotiAttInfo 1514 indicates field information of a notification message. First, a notiAttOID is a string indicating an OID of a field for giving notification. The notiAttOID indicates a full OID in the scalar and indicates a value from which an index has been excluded in the table. A notiAttName indicates a string of a field name defined in the SNMP interface header file. A notiASNType indicates a type of an attribute syntax expressed in the MIB. A notiFieldType determines an attribute type. The purposes of the other fields are varied according to the notiFieldType. A notiAttType indicates a C data type of the field. A notiAttSize indicates a field size. A notiStartOffset is an offset value for indicating a field position in structure information received from an application. A subNotiAttOffset is an offset value for indicating the NotiAttInfo for expressing an array if the current field indicates the array. A notiMaxDimensionValue indicates the maximum index value when the type is an array and index in the NotiAttInfo extended by use of the array. This means the maximum value of the array. Finally, the nextNotiAttInfoOffset is an offset value for indicating the next NotiAttInfo 1514. In the NotiAttInfo 1514, an index is placed in the head part. If multiple tables comprise notification, an index is placed after a value and the next index and value are placed.

A meaning of each field differs according to the notiFieldType of the NotiAttInfo 1514. This is shown in the following tables. A case where the notiFieldType is a scalar value is shown in Table 19 by way of example.

TABLE 19

| Field Name | Description | Comment |
| --- | --- | --- |
| notiAttOID | This indicates a total OID string of a scalar. | |
| notiAttName | This indicates a string of a structure field name. | This has the identical meaning |

TABLE 19-continued

| Field Name | Description | Comment |
| --- | --- | --- |
| | | regardless of notiFieldType. |
| notiASNType | This indicates a syntax type of the field. | |
| notiFieldType | This indicates a field type (scalar value). | |
| notiAttType | This indicates a C type of the field. | |
| notiAttSize | This indicates a field size. | |
| notiStartOffset | This indicates an offset value for a start field in a notification structure. | This has the identical meaning regardless of notiFieldType. |
| subNotiAttInfoOffset | This is an offset value for indicating NotiAttinfo of each array. | |
| maxDimensionValue | This is unused and has a zero value. | |
| nextNotiAttInfoOffset | This indicates an offset value for indicating the next field. | This has the identical meaning regardless of notiFieldType. |

Next, a case where the notiFieldType is the table and index is shown in Table 20 by way of example.

TABLE 20

| Field Name | Description | Comment |
| --- | --- | --- |
| notiAttOID | This indicates an OID string of up to a table attribute. | |
| notiAttName | This indicates a string of a structure field name. | This has the identical meaning regardless of notiFieldType. |
| notiASNType | This indicates a syntax type of the field. | |
| notiFieldType | This indicates a field type (table and index). | |
| notiAttType | This indicates a C type of the field. | |
| notiAttSize | This indicates a field size. | |
| notiStartOffset | This indicates an offset value for a field start in a notification structure. | This has the identical meaning regardless of notiFieldType. |
| subNotiAttInfoOffset | This is unused and has a zero value. | |
| maxDimensionValue | This is unused and has a zero value. | |
| nextNotiAttInfoOffset | This indicates an offset value for indicating the next field. | This has the identical meaning regardless of notiFieldType. |

Next, a case where the notiFieldType is the table value is shown in Table 21 by way of example.

TABLE 21

| Field Name | Description | Comment |
| --- | --- | --- |
| notiAttOID | This indicates an OID string of up to a table attribute. | |
| notiAttName | This indicates a string of a structure field name. | This has the identical meaning |

TABLE 21-continued

| Field Name | Description | Comment |
|---|---|---|
| | | regardless of notiFieldType. |
| notiASNType | This indicates a syntax type of the field. | |
| notiFieldType | This indicates a field type (table value). | |
| notiAttType | This indicates a C type of the field. | |
| notiAttSize | This indicates a field size. | |
| notiStartOffset | This indicates an offset value for a start field in a notification structure. | This has the identical meaning regardless of notiFieldType. |
| subNotiAttInfoOffset | This is unused and has a zero value. | |
| maxDimensionValue | This is unused and has a zero value. | |
| nextNotiAttInfoOffset | This indicates an offset value for indicating the next field. | This has the identical meaning regardless of notiFieldType. |

Next, a case where the notiFieldType is the table and array is shown in Table 22 by way of example.

TABLE 22

| Field Name | Description | Comment |
|---|---|---|
| notiAttOID | This is unused and has a value of an empty string. | |
| notiAttName | This indicates a string of a structure field name. | This has the identical meaning regardless of notiFieldType. |
| notiASNType | This indicates a syntax type of the field. | |
| notiFieldType | This indicates a field type (table and array). | |
| notiAttType | This indicates a C type of the field. | |
| notiAttSize | This indicates a field size. | |
| notiStartOffset | This indicates an offset value for a start field in a notification structure. | This has the identical meaning regardless of notiFieldType. |
| subNotiAttInfoOffset | This indicates an offset value for indicating NotiAttInfo of an array value. | |
| maxDimensionValue | This is unused and has a zero value. | |
| nextNotiAttInfoOffset | This indicates an offset value for indicating the next field. | This has the identical meaning regardless of notiFieldType. |

Next, a case where the notiFieldType of the NotiAttInfo indicated by the subNotiAttInfoOffset of the NotiAttInfo 1514 is the array and index is shown in Table 23 by way of example.

TABLE 23

| Field Name | Description | Comment |
|---|---|---|
| notiAttOID | This indicates an OID string of up to a table attribute in the MIB. This table is a table extended by use of the array. | |
| notiAttName | This indicates a string of an attribute name in the MIB. | |
| notiASNType | This is always ASN_Unsigned32. (The value starts from 0.) | |
| notiFieldType | This indicates a field type (array and index). | |
| notiAttType | This indicates a C type of the field, and is always AttType_Int. | |
| notiAttSize | This indicates a field size, and is always 4. | |
| notiStartOffset | This is unused and has a zero value. | |
| subNotiAttInfoOffset | This is unused and has a zero value. | |
| maxDimensionValue | This indicates the maximum index value and determines an array size. | |
| nextNotiAttInfoOffset | This is unused and has a zero value. | |

Next, a case where the notiFieldType of the NotiAttInfo indicated by the subNotiAttInfoOffset of the NotiAttInfo 1514 is the table value is shown in Table 24 by way of example.

TABLE 24

| Field Name | Description | Comment |
| --- | --- | --- |
| notiAttOID | This indicates an OID string of up to a table attribute in the MIB. This table is a table extended by use of the array. | |
| notiAttName | This indicates a string of an attribute name in the MIB. | |
| notiASNType | This indicates a syntax type of the field. | |
| notiFieldType | This indicates a field type (table value). | |
| notiAttType | This indicates a C type of the field. | |
| notiAttSize | This indicates a field size. | |
| notiStartOffset | This is an offset value for a start of a field indicating an array in the original notification structure. The notiStartOffset value is the same as that of the case where the notiFieldType is the table and array. | |
| subNotiAttInfoOffset | This is unused and has a zero value. | |
| maxDimensionValue | This is unused and has a zero value. | |
| nextNotiAttInfoOffset | This is unused and has a zero value. | |

Figure 16:
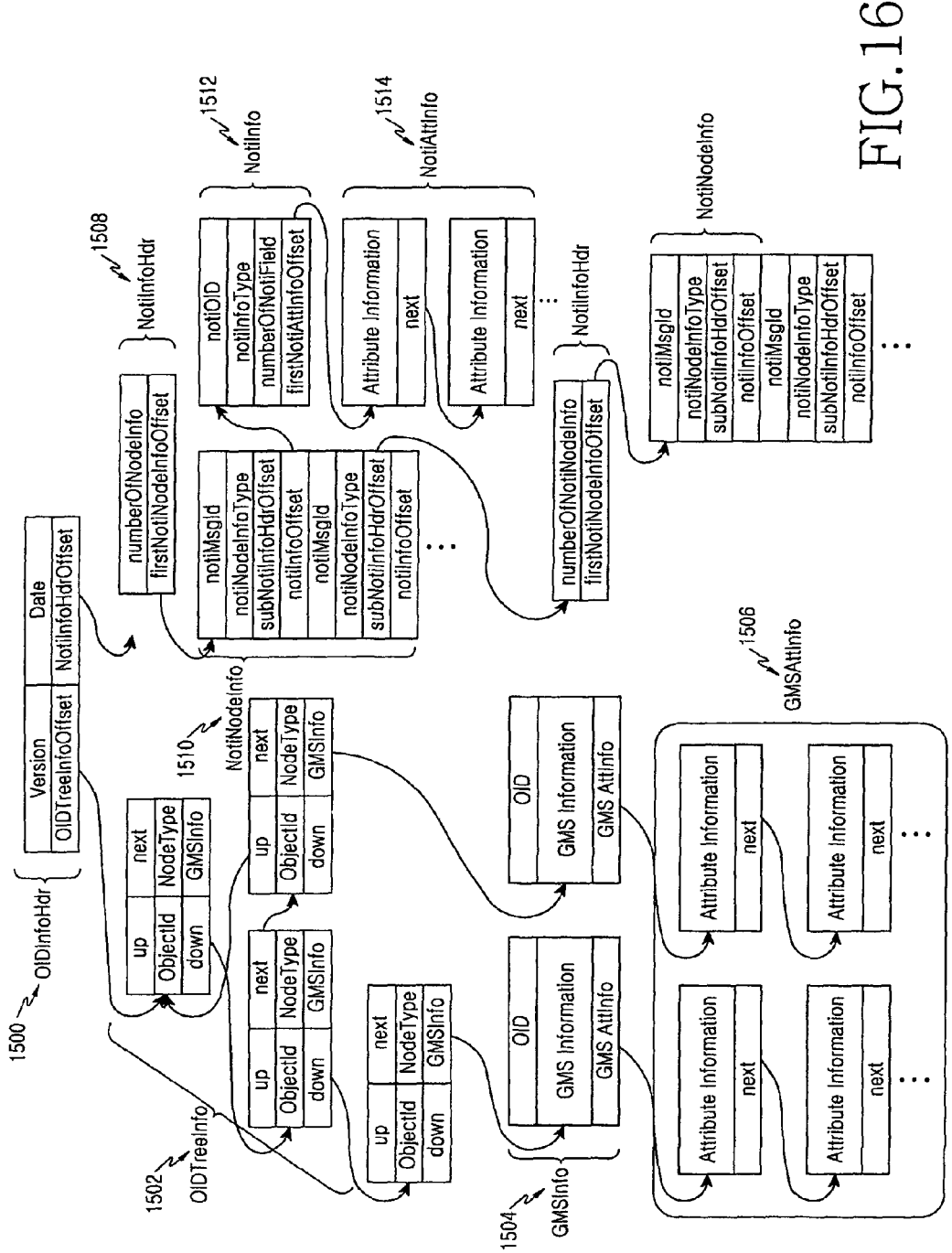
FIG. 16 is a diagram illustrating an exemplary structure of an object identifier information memory in accordance with an embodiment of the present invention.

FIG. 16 is a diagram illustrating an exemplary structure of the OIDInfo memory 500. The memory 500 can be divided into a part for searching a tree using an OID and a part for obtaining notification information using a message ID. One table expressed in the MIB is mapped to one GMS information element. In the case of the scalar, elements under a group are combined and the combined elements are mapped to one GMS information element. Also in the case of the scalar, elements under the group are combined and the combined elements are defined in one structure in which an index does not exist.

In accordance with an embodiment of the present invention, a method for retrieving GMS information for communication between the agent 400 and the application program 504 will now be described with reference to FIG. 17.

Figure 17:
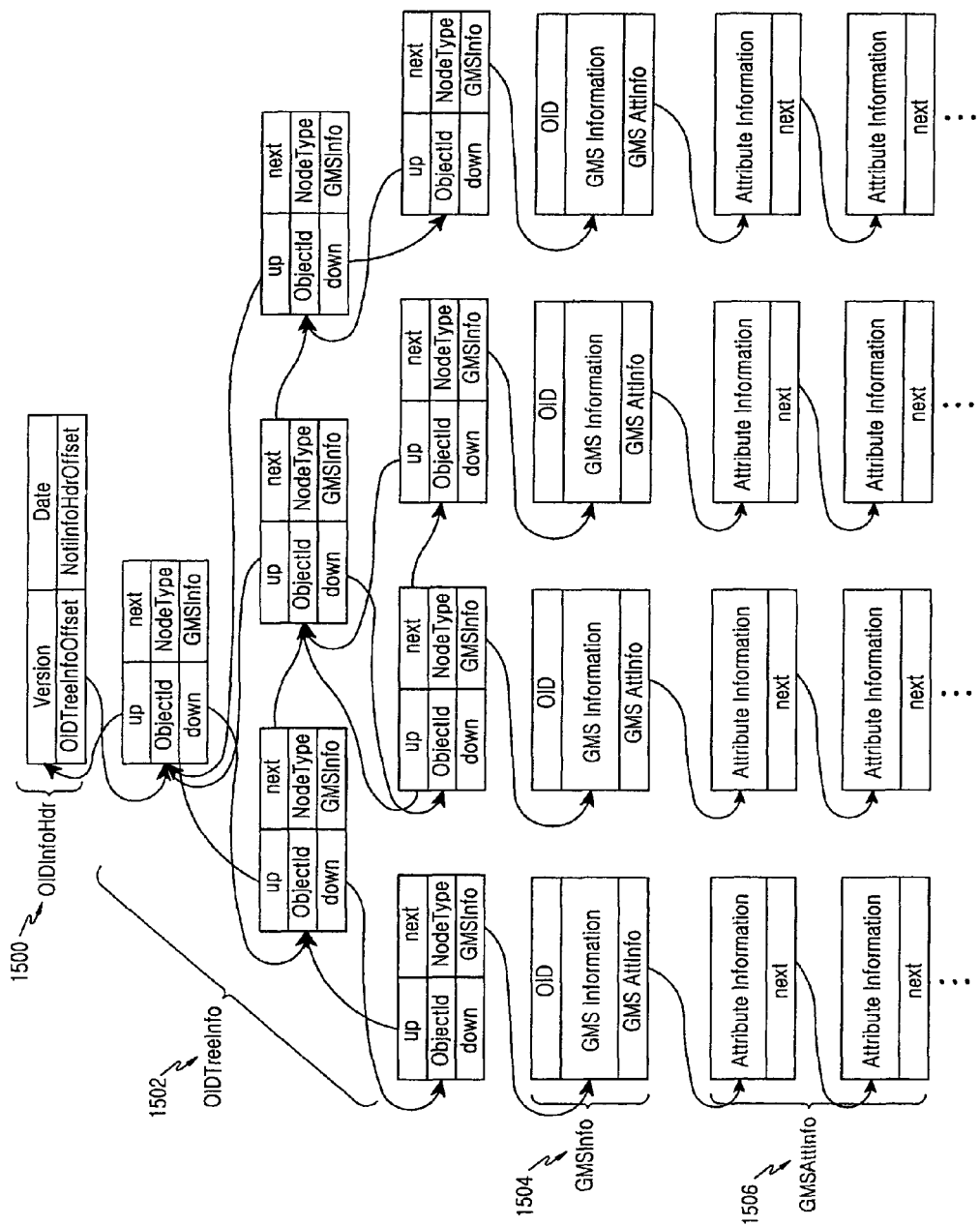
FIG. 17 is a diagram illustrating an exemplary method for retrieving GMS information in an object identifier information processor in accordance with an embodiment of the present invention.

FIG. 17 is a diagram illustrating an exemplary method for retrieving GMS information in accordance with an embodiment of the present invention. When an SNMP Get, Get-Next, Get-Bulk, or Set request is received from the manager 100, the OIDInfo processor 402 performs the following procedure to retrieve associated GMS information using an OID included in the Get, Get-Next, Get-Bulk, or Set message.

An OID string input from the agent 400 is separated and changed to an OID of an integer type. Then, the OIDTreeInfo 1502 is sequentially searched using a tree search algorithm according to the OID.

Then, the OIDInfo memory 500 returns the OIDTreeInfo 1502 mapped to the OID, and returns the next OIDTreeInfo subsequent to the OIDTreeInfo 1502 mapped to the OID. If the desired OIDTreeInfo is searched, the OIDInfo processor 402 returns the GMSInfo 1504 indicated by the OIDTreeInfo. Then, the agent 400 creates a GMS header and a payload using the GMSInfo 1504. When the GMS payload 1009 is created, an OAM header is inserted before the payload, the EM header subsequent to the OAM header is inserted to support SNMP between the agent 400 and the application program 504, and a structure value subsequent to the EM header is inserted. Structure field information completes a GMS PDU using the GMSAttInfo 1506. A message is then sent to the application program 504.

In accordance with an embodiment of the present invention, a method for retrieving notification information in the agent 400 will now be described with reference to FIG. 18.

Figure 18:
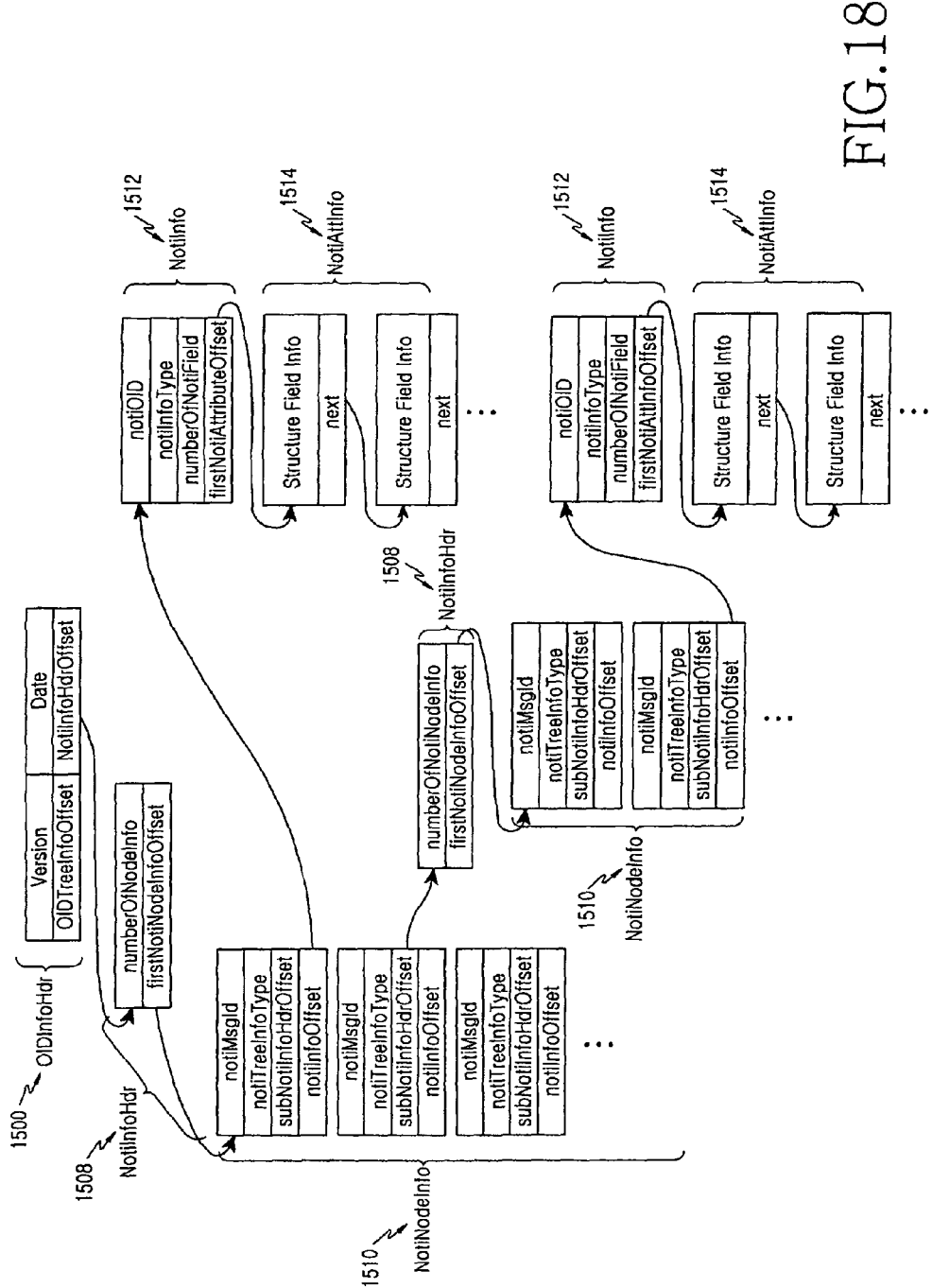
FIG. 18 is a diagram illustrating an exemplary method for retrieving notification information when an agent receives a Trap message from an application program in accordance with an embodiment of the present invention.

FIG. 18 is a diagram illustrating an exemplary method for retrieving notification information when the agent 400 receives a trap message from an application program in accordance with an embodiment of the present invention.

When the agent 400 receives a trap message with a preset message ID from the application program 504, the OIDInfo processor 402 retrieves SNMP notification information using the message ID.

First, the agent 400 determines if the number of IDs of the received message is one or two. The agent 400 checks a subMsgId field of the EM header 1002. If a value of the checked field is non-zero, the message ID of the GMS header 1000 is used as the first message ID and the subMsgId is used as the second message ID.

Then, the NotiNodeInfo 1510 is retrieved using the first message ID. The NotiNodeInfo 1510 is retrieved using the number of NotiNodeInfo fields 1510 of the NotiInfoHdr 1508 and a binary search algorithm. When the second message is provided, the NotiNodeInfo 1510 is retrieved using the number of subNotiNodeInfo fields of the NotiInfoHdr 1508 indicated by the subNotiInfoHdrOffset of the NotiNodeInfo 1510 and the binary search algorithm.

The notiInfoOffset of the NotiNodeInfo 1510 indicates the NotiInfo 1512 storing notification information. An SNMP notification message is created using the NotiInfo 1512 and the NotiAttInfo 1514. The created message is then sent to the manager 100.

In accordance with embodiments of the present invention, the SNMP agent does not need to add a function or perform new coding and recompiling operations if the extractor generates only a new OIDInfo file, even when a management target is changed or a management item is changed, added, or deleted. An MIB corresponding to a management item and an OIDInfo file can be automatically changed even when a structure used between the SNMP agent and the application program is added, changed, or deleted. Therefore, the SNMP agent can be easily developed and can be used for other devices or other management targets without modification.

While the present invention has been shown and described with reference to certain exemplary embodiments thereof, it will be understood by those skilled in the art that various changes in form and details may be made therein without departing from the spirit and scope of the present invention as defined by the appended claims. Accordingly, the scope of the present invention is not to be limited by the above embodiments but by the following claims and equivalents thereof.

What is claimed is:

1. A method for performing an operation for receiving a Simple Network Management Protocol (SNMP) request message including a management item from a manager for managing a communication device using SNMP and making an SNMP response message including a result of processing the management item, comprising the steps of:
creating an SNMP interface header file using an application program receiving a changed management item, and storing the SNMP interface header file in a header file memory in an SNMP agent;
reading, by the SNMP agent, the SNMP interface header file, and generating a management information base (MIB) file and an object identifier information (OIDInfo) file upon reading the SNMP interface header file wherein the object identifier information (OIDInfo) file controls the generation of a general message service (GMS) message between the SNMP agent and the application program;
receiving the SNMP request message for requesting data of the management item from the manager in the SNMP agent;
sending OIDInfo included in the SNMP request message from the SNMP agent to an OIDInfo processor in the SNMP agent such that the OIDInfo processor can read GMS information for communication between the SNMP agent and the application program from an OIDInfo memory in the SNMP agent;
sending the GMS information for communication between the SNMP agent and the application program storing the management item data requested by the manager from the OIDInfo processor to the SNMP agent based on the OIDInfo;
communicating with the application program in the SNMP agent based on the GMS information received from the OIDInfo processor by the SNMP agent, and receiving the result of processing the management item requested by the manager from the application program; and
sending the received result of processing the management item from the SNMP agent to the manager.

2. The method of claim 1, wherein the step of sending the GMS information for communication from the OIDInfo processor to the SNMP agent comprises the steps of:
retrieving GMS information, for communication between the SNMP agent and the application program, from the OIDInfo file mapped to the OIDInfo of the OIDInfo memory in the OIDInfo processor and generating the GMS message based thereon; and
sending the GMS information from the OIDInfo processor to the SNMP agent.

3. The method of claim 2, wherein the GMS information comprises information about at least one of a port number, a communication type of the application program, and a payload data structure for communication between the SNMP agent and the application program.

4. The method of claim 1, further comprising the step of:
storing, by the SNMP agent, the MIB file for subsequently managing the communication device using Simple Network Management Protocol (SNMP) at the compile time, and storing, by the SNMP agent, the OIDInfo file for subsequently communicating between the SNMP agent and the application program.

5. A communication device comprising therein a Simple Network Management Protocol (SNMP) agent for managing a communication using SNMP for receiving an SNMP request message including a management item from a manager for managing the communication device using SNMP and making an SNMP response of a result of processing the management item, wherein the SNMP agent executes by the communication device:
an extractor for reading an SNMP interface header file created by an application program receiving a changed management item from an SNMP interface header file memory, and for generating a management information base (MIB) file and an object identifier information (OIDInfo) file upon reading the SNMP interface header file for communication by the SNMP agent with the application program wherein the object identifier information (OIDInfo) file controls the generation of a general message service (GMS) message between the SNMP agent and an application program;
an OIDInfo processor in the SNMP agent configured to read GMS information for communication between the SNMP agent and an application program from an OIDInfo memory in the SNMP agent and provide the read GMS information to the SNMP agent when receiving predetermined OIDInfo mapped to the management item in an SNMP request message received by the SNMP agent; and
an SNMP agent module for sending, to the OIDInfo processor, the OIDInfo mapped to the management item when receiving the SNMP request message from a manager, obtaining the GMS information for communication with the application program, receiving a result of processing the management item from the application program, and sending the processing result to the manager.

6. The SNMP agent of claim 5, wherein the SNMP agent comprises:
the OIDInfo memory for storing the OIDInfo data file comprising the GMS information for communication between the SNMP agent and the application program; and
the OIDInfo processor for retrieving the GMS information for communication between the SNMP agent and the application program from the OIDInfo data file of the OIDInfo memory, and sending the GMS information to the SNMP agent.

7. The SNMP agent of claim 6, wherein the OIDInfo memory is configured to store OIDInfo library application programming interfaces (APIs) and OIDInfo data files.

8. The SNMP agent of claim 5, wherein the GMS information for communication between the SNMP agent and the application program comprises general message service (GMS) information.

9. The SNMP agent of claim 8, wherein the GMS information comprises information about at least one of a port number, a communication type of the application program, and a payload data structure for communication between the SNMP agent and the application program.

10. The SNMP agent of claim 5, wherein the SNMP agent comprises:
an MIB file memory of the SNMP agent for storing the MIB file created by the extractor; and
the OIDInfo memory of the SNMP agent for storing the OIDInfo file created by the extractor.

11. The SNMP agent of claim 10, wherein the message between the OIDInfo processor and the SNMP agent comprises GMS information from the OIDInfo memory for communication between the SNMP agent and the application program, such information comprising information about a port number, a message format, a communication type, and a payload structure.

* * * * *